(12) United States Patent
Choi et al.

(10) Patent No.: US 9,894,627 B2
(45) Date of Patent: Feb. 13, 2018

(54) METHOD FOR TRANSMITTING INFORMATION FOR SYNCHRONIZATION OF USER EQUIPMENT BY BASE STATION IN WIRELESS COMMUNICATION SYSTEM AND APPARATUS FOR SAME

(71) Applicant: LG ELECTRONICS INC., Seoul (KR)

(72) Inventors: Hyeyoung Choi, Seoul (KR); Jaehoon Chung, Seoul (KR); Genebeck Hahn, Seoul (KR); Ilmu Byun, Seoul (KR); Jinmin Kim, Seoul (KR); Heejeong Cho, Seoul (KR); Eunjong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 113 days.

(21) Appl. No.: 14/892,430

(22) PCT Filed: May 16, 2014

(86) PCT No.: PCT/KR2014/004408
§ 371 (c)(1),
(2) Date: Nov. 19, 2015

(87) PCT Pub. No.: WO2014/196748
PCT Pub. Date: Dec. 11, 2014

(65) Prior Publication Data
US 2016/0100374 A1    Apr. 7, 2016

Related U.S. Application Data

(60) Provisional application No. 61/831,105, filed on Jun. 4, 2013.

(51) Int. Cl.
*H04W 56/00* (2009.01)
*H04W 36/04* (2009.01)

(52) U.S. Cl.
CPC ....... *H04W 56/0015* (2013.01); *H04W 36/04* (2013.01); *H04W 56/0045* (2013.01)

(58) Field of Classification Search
CPC ......... H04W 56/0015; H04W 56/0045; H04W 36/04
See application file for complete search history.

(56) References Cited

U.S. PATENT DOCUMENTS

2007/0238463 A1* 10/2007 Ogami .............. H04W 36/0033
455/436
2008/0225796 A1*  9/2008 Malladi ............. H04W 72/1284
370/331

(Continued)

FOREIGN PATENT DOCUMENTS

KR         10-0980259 B1      9/2010
KR     10-2011-0069977 A      6/2011

(Continued)

*Primary Examiner* — Min Jung
(74) *Attorney, Agent, or Firm* — Dentons US LLP

(57) ABSTRACT

The present invention relates to a method for transmitting information for synchronization of a user equipment by a base station in a wireless communication system and apparatus for the same. In one embodiment of the present invention, a source base station transmits a request message requesting uplink synchronization information according to a predetermined reference to a target base station, receives a response message including the synchronization information from the target base station in response to the requested message, and transmits the received synchronization information to one or more user equipments which are to move to a cell serviced by the target base station. The synchronization information is used when the user equipments move to the cell serviced by the target base station without a process of acquiring the synchronization information.

15 Claims, 21 Drawing Sheets

(56) References Cited

U.S. PATENT DOCUMENTS

| | | | |
|---|---|---|---|
| 2011/0151872 A1 | 6/2011 | Kwon et al. | |
| 2012/0294287 A1* | 11/2012 | Jeong | H04L 5/001 370/331 |
| 2013/0021929 A1 | 1/2013 | Kim | |
| 2013/0100931 A1* | 4/2013 | Kim | H04L 5/001 370/331 |
| 2013/0216002 A1* | 8/2013 | Suh | H04L 27/2613 375/308 |
| 2015/0172973 A1* | 6/2015 | Jeong | H04L 5/001 370/331 |

FOREIGN PATENT DOCUMENTS

| | | |
|---|---|---|
| KR | 10-1108038 B1 | 1/2012 |
| KR | 10-2013-0001096 A | 1/2013 |
| KR | 10-2013-0008468 A | 1/2013 |

\* cited by examiner

METHOD FOR TRANSMITTING INFORMATION FOR SYNCHRONIZATION OF USER EQUIPMENT BY BASE STATION IN WIRELESS COMMUNICATION SYSTEM AND APPARATUS FOR SAME

This application is a 35 U.S.C. § 371 National Stage Entry of International Application No. PCT/KR2014/004408 filed May 16, 2014, which claims benefit of and priority to U.S. Provisional Application Nos. 61/831,105 filed Jun. 4, 2013, each of which are incorporated by reference for all purposes as if fully set forth herein.

TECHNICAL FIELD

The present invention relates to a wireless communication system, and more particularly, to a method for a base station to transmit information for synchronization of a user equipment in a wireless communication system and apparatus for the same.

BACKGROUND ART

Generally, a wireless communication system including a base station (BS) and a user equipment (UE) provides various types of communication services such as voice, data and the like to user equipments through one or more base stations. In general, a single base station may cover at least one or more cells.

Recently, a structure of the wireless communication system has been changed from a type of a centralized base station based on a macro cell corresponding to the conventional vertical structure into a type based on various kinds of small cells such as a pico cell, a femto cell and the like interconnected with the macro cell.

In small cell enhancements for E-UTRA and E-UTRAN SI (study item) as one of $3^{rd}$ generation partnership project (3GPP) standard scopes, ongoing research has been made in order to enhance indoor/outdoor scenarios using low power nodes.

Moreover, according to small cell enhancements for E-UTRA and E-UTRAN SI, a concept of dual connectivity, which enables a user equipment to have simultaneous connectivity to a macro cell layer and a small cell layer, has been applied.

In a heterogeneous network deployment in which the macro cell and various kinds of small cells such as the pico cell, the femto cell and the like for low-power/short-range communication coexist, random user equipments may be put in a dual connectivity state in a manner of being simultaneously connected to the small cells as well as the macro cell for throughput performance improvement and mobility enhancement.

If a dual connectivity user equipment moves, events such as change, removal and addition of the small cells may occur frequently, whereby transmission of radio resource control (re)-configuration messages may occur frequently.

In addition, if a random user equipment performs uplink synchronization (UL) in order to perform RRC (radio resource control) connection on a small cell, while the small cell belongs to sTAG (secondary timing advance group) different from sTAG to which an existing cell belongs (e.g., an inter band is used), the corresponding user equipment needs to perform an additional random access procedure.

Furthermore, in the case of the heterogeneous network deployment or in case of an environment in which only small cells exist without the macro cell, a random user equipment can be served by a specific small cell.

If the dual connectivity user equipment moves, a handover procedure event between small cells may be performed frequently. And, the random access procedure may be performed for the UL synchronization in the case of such a handover procedure. Moreover, if the handover procedure is performed, while a cell (or CC (component element)) served by a specific small cell belongs to sTAG (secondary timing advance group) different from sTAG to which the macro cell (or Pcell) belongs (e.g., inter band is used), an additional random access procedure is performed.

In the above-mentioned processes, each user equipment needs to independently perform a random access procedure in order to perform UL synchronization. Thus, the random access procedure may be performed frequently.

In this case, it may cause a problem of increasing burden on a base station and a user equipment that perform the random access procedure frequently and a problem that delay occurs frequently in the course of obtaining the UL synchronization. Therefore, the above-mentioned problems should be solved and methods of solving the problems are required.

DISCLOSURE OF THE INVENTION

Technical Task

The present invention is proposed to satisfy the above-mentioned need of the related art. One technical task of the present invention is to provide a method for a base station to transmit information for synchronization of a user equipment in a wireless communication system.

Another technical task of the present invention is to provide a method for a base station to perform a process for obtaining uplink (UL) synchronization performed by each user equipment.

Another technical task of the present invention is to provide a method for a user equipment to perform a random access procedure for fast handover by obtaining uplink synchronization information from a base station.

Another technical task of the present invention is to provide to a method for a user equipment to perform an additional connection to a small cell by obtaining uplink synchronization information from a base station.

Further technical task of the present invention is to provide an apparatus for supporting the above-mentioned methods.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solutions

To achieve these objects and other advantages and in accordance with the purpose of the invention, a method of transmitting information for uplink synchronization of a user equipment transmitted by a base station in a wireless communication system, the method comprising:

transmitting, by a source base station, a request message requesting uplink synchronization information to a target base station according to a predetermined standard; receiving, by a source base station, a response message including synchronization information from the target base station in response to the request message; and transmitting, by a source base station, the received synchronization information to one or more user equipments intending to move into a cell served by the target base station, wherein the synchronization information is used for the user equipments to move into the cell served by the target base station without a procedure for obtaining the synchronization information.

In another aspect of the present invention, the source base station comprises a small fixed base station with a constant distance from the target base station and small coverage compared to a macro base station.

In another aspect of the present invention, the synchronization information comprises a TA (timing advance) value between the source base station and the target base station.

In another aspect of the present invention, the predetermined standard comprises a case that even if the source base station receives measurement information on the target base station from the user equipment, the source base station is unable to know a TA (timing advance) value between the source base station and the target base station.

In another aspect of the present invention, the response message is received through a backhaul network between the source base station and the target base station.

In another aspect of the present invention, the received synchronization information is transmitted to the additional base station.

In another aspect of the present invention, the source base station comprises a base station providing service to a 1st Pcell (primary cell), and the user equipments comprise user equipments moving from the 1st Pcell to a 2nd Pcell served by the target base station.

In another aspect of the present invention, the source base station comprises a base station providing service to a 1st Scell (secondary cell), and the user equipments comprise user equipments moving from a 1st Pcell (primary cell) to a 2nd Pcell served by the target base station.

In another aspect of the present invention, the source base station comprises a base station providing service to a 1st Scell (secondary cell), and the user equipments comprise user equipments further adding a 2nd Scell served by the target base station besides the 1st Scell.

In another aspect of the present invention, a method of performing communication performed by a user equipment in a wireless access network environment, the method comprising: transmitting a request message for moving into a cell served by a target base station to a source base station; receiving information for uplink synchronization with the target base station from the source base station; and performing a procedure for moving into the cell served by the target base station without a procedure for obtaining uplink synchronization information.

In another aspect of the present invention, in performing communication in a wireless communication system, a user equipment comprising: a transmitting unit; a receiving unit; and a processor configured to: support the user equipment to perform the communication by being connected to the transmitting unit and the receiving unit, transmit a request message for moving into a cell served by a target base station to a source base station, receive information for uplink synchronization with the target base station from the source base station, perform a procedure for moving into the cell served by the target base station without a procedure for obtaining uplink synchronization information.

In another aspect of the present invention, in transmitting information for uplink synchronization of a user equipment in a wireless communication system, an apparatus comprising: a transmitting unit; a receiving unit; and a processor configured to: support the apparatus to perform communication by being connected to the transmitting unit and the receiving unit, transmit a request message requesting synchronization information to a target base station to which the user equipment performs handover according to a predetermined standard, receive a response message including the synchronization information from the target base station in response to the request message, transmit the received synchronization information to one or more user equipments intending to move into a cell served by the target base station, wherein the synchronization information is used for the user equipments to move into the cell served by the target base station without a procedure for obtaining the synchronization information.

In another aspect of the present invention of apparatus, the synchronization information comprises a TA (timing advance) value between the apparatus and the target base station.

In another aspect of the present invention of apparatus, the predetermined standard comprises a case that even if the receiving unit receives measurement information on the target base station from the user equipment, the processor is unable to know a TA (timing advance) value between the source base station and the target base station.

In another aspect of the present invention of apparatus, the predetermined standard comprises a case that the number of user equipments to perform handover to the target base station is equal to or larger than a prescribed number.

In another aspect of the present invention of apparatus, the predetermined standard comprises a case that even if the receiving unit receives a TA (timing advance) information request message from an additional base station in a situation that the user equipment is simultaneously connected to the additional base station besides the apparatus, the processor is unable to know a TA (timing advance) value between the apparatus and the target base station.

In another aspect of the present invention of apparatus, the apparatus further comprises a timer and wherein the predetermined standard comprises a case that a set time of the timer elapses.

Advantageous Effects

According to the present invention, a base station can transmit information for synchronization of a user equipment in a wireless communication system.

According to the present invention, a base station can perform a process for obtaining uplink (UL) synchronization performed by each user equipment.

According to the present invention, a user equipment can perform a random access procedure for fast handover by obtaining uplink synchronization information from a base station.

According to the present invention, a user equipment can perform an additional connection to a small cell by obtaining uplink synchronization information from a base station.

Effects obtainable from the present invention are non-limited by the above mentioned effects. And, other unmentioned effects can be clearly understood from the following description by those having ordinary skill in the technical field to which the present invention pertains.

DESCRIPTION OF DRAWINGS

The accompanying drawings, which are included to provide a further understanding of the invention, illustrate embodiments of the invention and together with the detailed description serve to explain the principles of the invention. However, the technical features of the present invention may not be limited to a specific drawing and features disclosed in each of the drawings may be combined with each other to constitute a new embodiment. The same reference numerals are used to indicate the same structural elements throughout the drawings.

BEST MODE FOR INVENTION

Figure 1:
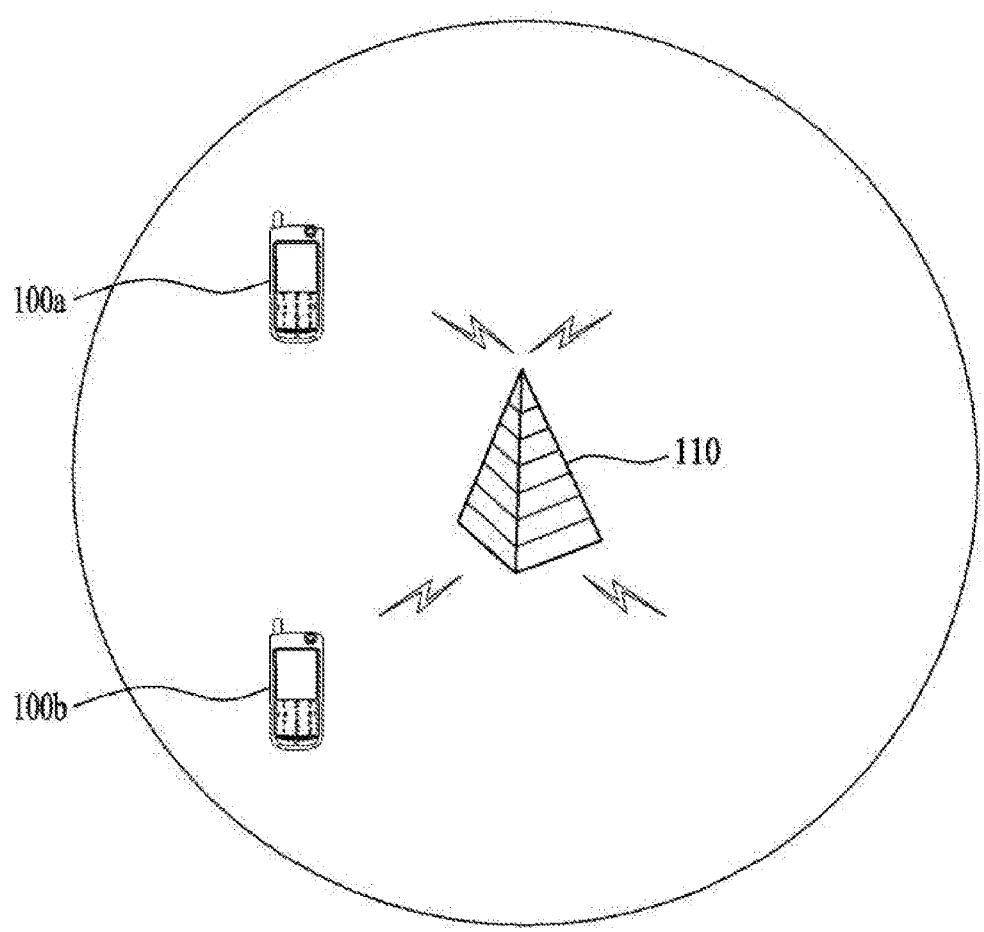
FIG. 1 is a diagram for an example of a general wireless access system to which the present invention is applicable.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide the full understanding of the present invention. However, it will be apparent to those skilled in the art that the present invention may be implemented without such specific details.

Occasionally, to avoid obscuring the concept of the present invention, structures and/or devices known to the public may be skipped or represented as block diagrams centering on the core functions of the structures and/or devices.

Throughout this specification and the claims that follow, when it is described that one part "includes or comprises" an element, unless specifically mentioned to the contrary, it may means that the one part may further include other elements instead of excluding any other element.

Moreover, the term "unit (or part)" mentioned in the present specification refers to a unit for processing at least one function or operation and it may be embodied in the form of hardware, software, or combination thereof. Furthermore, the term "a (or an)", the term "one" and other related terms for a singular expression may include a plural meaning as well as a singular meaning unless they are specifically indicated in this specification or a description to the contrary is specifically pointed out in context.

Specific terminologies used for the embodiments of the present invention may be provided to help the understanding of the present invention. Unless differently defined, all terms used herein including the technical or scientific terms, have the same meanings as the terms generally understood by those skilled in the art to which the present invention pertains. Moreover, the use of the specific terminology may be modified into other forms within the scope of the technical idea of the present invention.

The terms such as 'first', 'second', etc. may be used to describe various components throughout this specification and the claims that follow but the elements should not be limited by the terms. The terms may be used only for discriminating one element from others. For example, a first component may be referred to as a second component within the scope of the appended claims and their equivalents and likewise the second component may be referred to as the first component.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

FIG. 1 is a diagram for an example of a general wireless access system to which the present invention is applicable.

Referring to FIG. 1, a general wireless access system to which the present invention is applicable may include a base station (BS) 110 and at least one user equipment (UE) 100a and 100b.

In the present invention, the base station 110 may be meaningful as a terminal node of a network which directly performs communication with the user equipment 100a and 100b. Moreover, in the present invention, a specific operation explained as performed by the base station 110 may be performed by an upper node of the base station in some cases.

In particular, in a network constructed with a plurality of network nodes including the base station 110, it is apparent that various operations performed for communication with the user equipment can be performed by the base station or other network nodes except the base station.

In the present invention, 'base station 110' may be substituted with such a terminology as a fixed station, a Node B, an eNode B (eNB), an access point (AP) and the like.

And, 'user equipment 110a and 110b' may be substituted with such a terminology as a terminal, a mobile station (MS), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device and the like.

The embodiments of the present invention may be implemented based on at least one of wireless access systems including IEEE 802 system, 3GPP system, 3GPP LTE system, LTE-A (LTE-Advanced) system and 3GPP2 system. And, at least one of them may be supported by the disclosed standard documents.

Moreover, the following technology may be used in various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like.

CDMA can be implemented with such a radio technology as UTRA (universal terrestrial radio access), CDMA 2000 and the like. TDMA can be implemented with such a radio technology as GSM/GPRS/EDGE (Global System for Mobile communications/General Packet Radio Service/Enhanced Data Rates for GSM Evolution).

In addition, OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink and SC-FDMA in uplink. And, LTE-A (LTE-Advanced) is an evolved version of 3GPP LTE.

Figure 2:
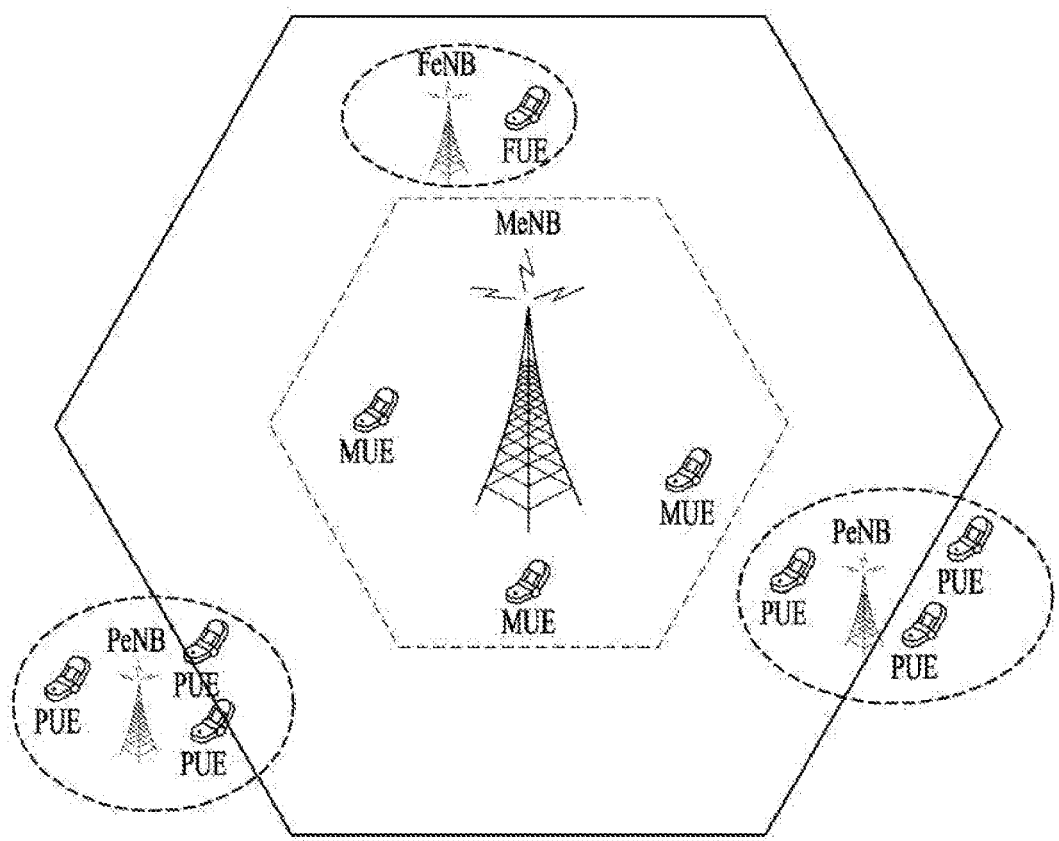
FIG. 2 is a diagram of a heterogeneous network deployment to which the present invention is applicable.

FIG. 2 is a diagram of a heterogeneous network deployment to which the present invention is applicable.

As mentioned in the foregoing description, to guarantee a more stable data service such as multimedia service in a next-generation wireless access network, much attention has been attracted to a hierarchical cell structure or heterogeneous cell structure in which a small cell (e.g., pico cell or femto cell) for low-power/short-range communication coexist together with a homogeneous network based on a macro cell since additional installation of a macro cell base station is inefficient in terms of cost and complexity in consideration of system performance improvement.

A heterogeneous network structure considered for a wireless access network may be implemented in the form as illustrated in FIG. 1. A plurality of small cells may coexist in one macro cell. And, each of small cell base stations is allocated resources according to a cell coordination scheme and then serves user equipments.

The above small cells may be categorized into two types in accordance with an access scheme.

The first type is a closed subscriber group (CSG) and the second type is an open access subscriber group (OSG). In case of CSG, CSG ID (identification) is assigned by performing grouping on user equipments capable of accessing the CSG. Moreover, it may discriminate a user equipment having CSG ID from a user equipment with no CSG ID when user equipments access the CSG. In particular, access to the CSG is not allowed without authentication. However, in case of OSG, all user equipment can access a corresponding cell.

Figure 3:
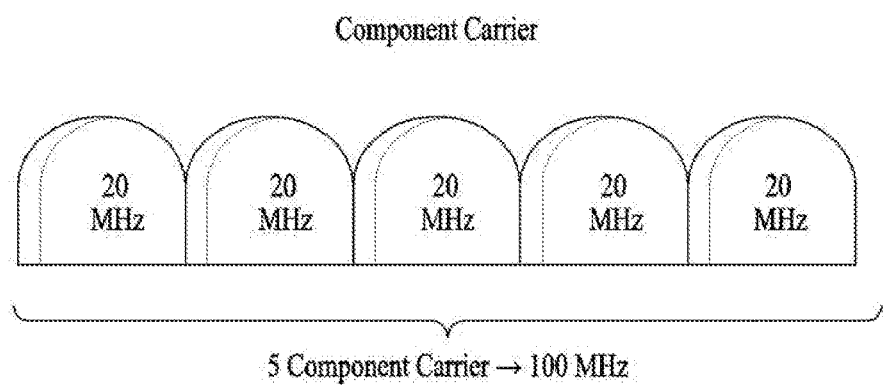
FIG. 3 is a diagram to describe carrier aggregation (CA) usable in the present invention.

FIG. 3 is a diagram to describe carrier aggregation (CA) usable in the present invention.

In FIG. 3, carrier aggregation in which one or more carriers are combined is illustrated.

Carrier aggregation is a representative technology of LTE-A. Before describing the carrier aggregation, LTE and LTE-A are explained in the following description.

LTE system is a mobile communication system evolved from UMTS (universal mobile telecommunication system) and LTE system standards are established by 3GPP ($3^{rd}$ generation partnership project).

An LTE system structure may be mainly divided into E-UTRAN (evolved UMTS terrestrial radio access network) and EPC (evolved packet core). The E-UTRAN includes a user equipment (UE) and a base station (eNB). Uu interface connects the UE and the eNB together. And, X2 interface connects eNBs together. The EPC includes MME (mobility management entity) responsible for a control plane function and S-GW (serving gateway) responsible for a user plane function. S1-MME interface connects the eNB and the MME together and S1-U interface connects the eNB and the S-GW together. Particularly, theses 2 interfaces may be called S1 interface overall.

LTE-A (long term evolution-advanced) system has evolved from the LTE system according to the IMT-advanced condition corresponding to the fourth-generation mobile communication condition recommended by ITU-R (international telecommunication union-Radiocommunication sector), the LTE-A system standardization is now being conducted in the 3GPP that has developed the current LTE system standard.

A representative technology newly added to the LTE-A system may include a carrier aggregation (CA) technology that extends or flexibly utilizes a bandwidth.

According to the carrier aggregation, carriers in the conventional LTE system are defined as component carriers and the component carriers are used by making a bundle of maximum 5 component carriers as shown in FIG. 3. Since each of the component carriers has maximum 20 MHz of bandwidth similar to the LTE system, the CA technology of the LTE-A may extend bandwidth up to maximum 100 MHz. As mentioned in the above description, the technology for aggregating and using a plurality of component carriers is referred to as the carrier aggregation (CA).

Figure 4:
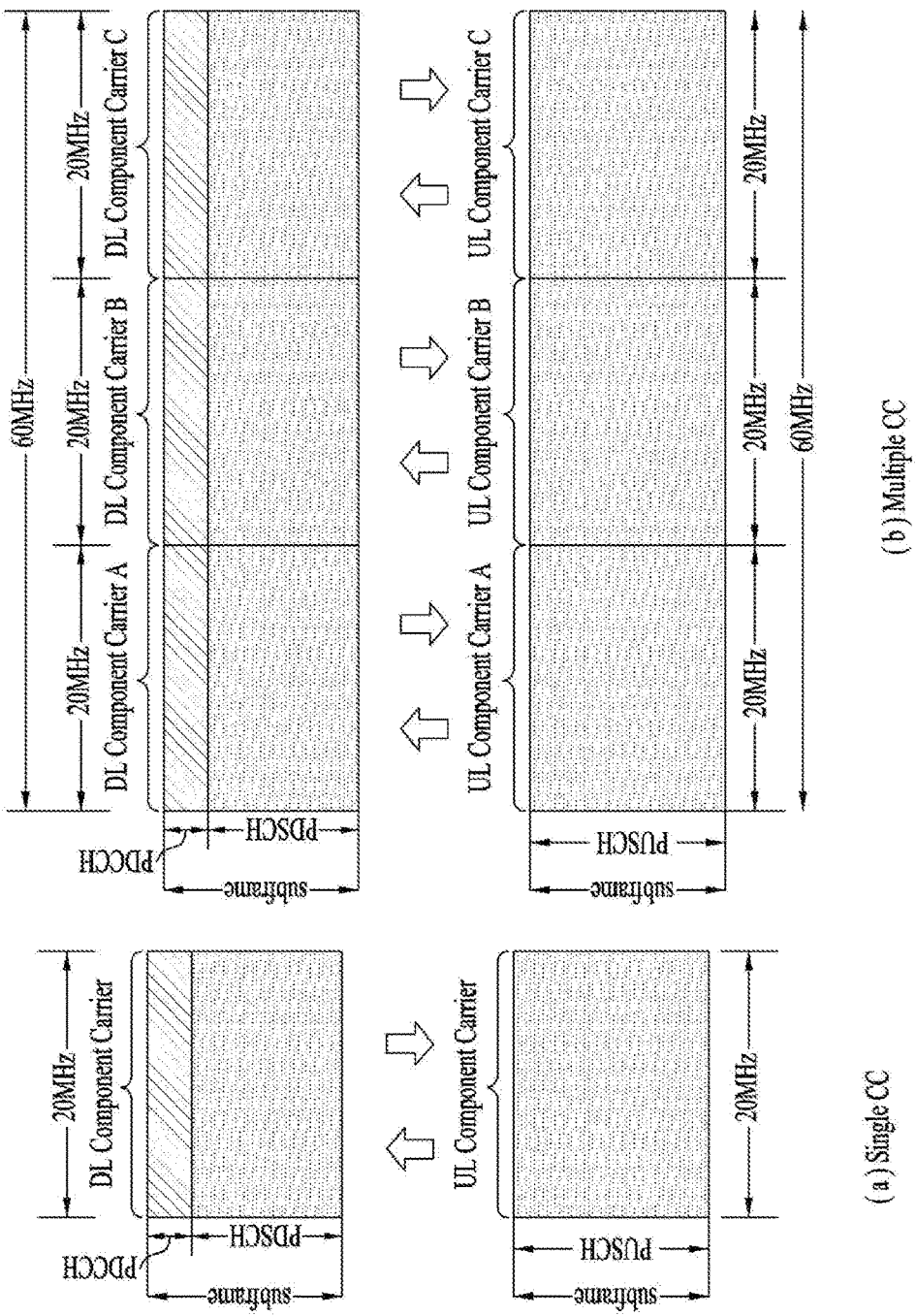
FIG. 4 is a diagram for a structure of a subframe in LTE-A (long term evolution-advanced) system to which carrier aggregation usable in the present invention is applied.

FIG. 4 is a diagram for a structure of a subframe in LTE-A (long term evolution-advanced) system to which carrier aggregation usable in the present invention is applied.

Referring to FIG. 4, FIG. 4 (a) illustrates structures of UL and DL subframes in a single component carrier situation in which one component carrier is used. In this case, the system has 20 MHz of bandwidth similar to the conventional LTE system.

And, FIG. 4 (b) illustrates structures of UL and DL subframes in a multiple component carrier situation in which a plurality of component carriers are used. In FIG. 4 (b), since carrier aggregation is performed in a manner of combining 3 component carriers, it may have 60 MHz of bandwidth.

Generally, one component carrier is mainly taken into consideration in a wireless communication system although an uplink and a downlink are set to differ from each other in bandwidth. In 3GPP ($3^{rd}$ generation partnership project) LTE (long term evolution), based on a single component carrier as shown in FIG. 4 (a), the number of component carriers configuring each of uplink and downlink is set to 1 and bandwidths of the uplink and downlink are symmetric to each other in general.

Meanwhile, 3GPP LTE system supports a case in which a downlink bandwidth and an uplink bandwidth are differently set, which is made under a precondition of a single component carrier (CC). This means that the 3GPP LTE supports only the case in which the downlink bandwidth and the uplink bandwidth are the same or different under the situation in which a single component carrier for the downlink and the uplink, respectively, is defined. For example, the 3GPP LTE system supports a maximum of 20 MHz and may have different uplink bandwidth and downlink bandwidth, but supports only the single component carrier in the uplink and the downlink.

On the other hand, the carrier aggregation supports a plurality of component carriers. The carrier aggregation is introduced to support increased throughput, prevent an increase in cost due to an introduction of a broadband radio frequency (RF) device, and secure compatibility with the existing system. For example, when 5 carriers are allocated as granularity in a carrier unit having a bandwidth of 20 MHz, it may support a maximum bandwidth of 100 MHz.

The carrier aggregation may be divided into contiguous carrier aggregation formed between continuous carriers in frequency domain and non-contiguous carrier aggregation formed between carriers in which aggregation is discontinuous.

The number of CCs aggregated between uplink and downlink may be differently set. The case in which the number of downlink CCs and the number of uplink CCs are the same is symmetric carrier aggregation and the case in which the number of downlink CCs and the number of uplink CCs are different is referred to as asymmetric carrier aggregation.

The sizes (i.e., bandwidths) of multiple carriers may be set different from each other. For example, when 3 carriers are used to configure a bandwidth of 60 MHz as shown in FIG. 4 (b), the carriers may be configured like 20 MHz carrier (carrier #1)+20 MHz carrier (carrier #2)+20 MHz carrier (carrier #3).

In the present invention, the contiguous carrier aggregation and/or the non-contiguous carrier aggregation may be assumed. Moreover, symmetric carrier aggregation and/or asymmetric carrier aggregation may be used.

Figure 5:
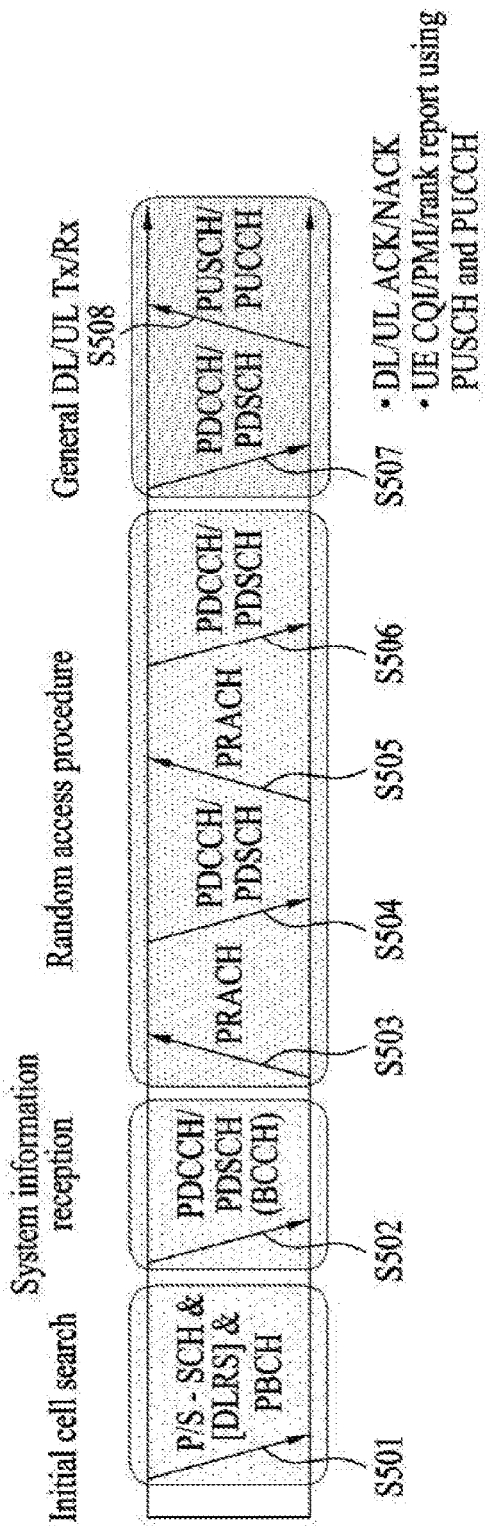
FIG. 5 is a diagram to describe physical channels used in 3GPP ($3^{rd}$ generation partnership project) LTE (long term evolution) system usable in the present invention and a general signal transmission method using the same.

FIG. 5 is a diagram to describe physical channels used in 3GPP (3rd generation partnership project) LTE (long term evolution) system usable in the present invention and a general signal transmission method using the same.

Referring to FIG. 5, If power of a user equipment is turned on or the user equipment enters a new cell, the user equipment performs initial cell search work for matching synchronization with a base station and the like [S501]. To this end, the user equipment receives a primary synchronization channel (P-SCH) and a secondary synchronization channel (S-SCH) from the base station, matches synchronization with the base station and is then able to obtain information such as a cell identity (ID) and the like.

Subsequently, the user equipment receives PBCH (physical broadcast channel) from the base station and is then able to obtain intra-cell broadcast information. Meanwhile, the user equipment receives DL RS (downlink reference signal) in the step of the initial cell search and is then able to check a downlink channel state.

Having completed the initial cell search, the user equipment receives a physical downlink control channel (PDCCH) and a physical downlink shared control channel (PDSCH) according to information carried on the PDCCH and is then able to obtain system information in further detail [S502].

Thereafter, the user equipment may perform a random access procedure to complete the access to the base station [S503 to S506]. To this end, the user equipment may transmit a preamble through a physical random access channel (PRACH) [S503] and then receive a response message through PDCCH and a corresponding PDSCH in response to the preamble [S504]. In case of a contention based random access, the user equipment may perform transmission of an additional physical random access channel signal [S505]. In addition, in response to the step S505, the user equipment may perform a contention resolution procedure such as reception of a physical downlink control channel signal and a corresponding physical downlink shared channel signal [S506].

Having performed the above mentioned procedures, the user equipment may perform PDCCH/PDSCH reception S507 and PUSCH/PUCCH (physical uplink shared channel/physical uplink control channel) transmission S508 as a general uplink/downlink signal transmission procedure.

Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) information and the like.

In LTE system, the UCI is normally transmitted through PUCCH by periods. However, in case that both control information and traffic data need to be simultaneously transmitted, the UCI may be transmitted on PUSCH. Moreover, the UCI may be non-periodically transmitted in response to a request/indication made by a network.

Figure 6:
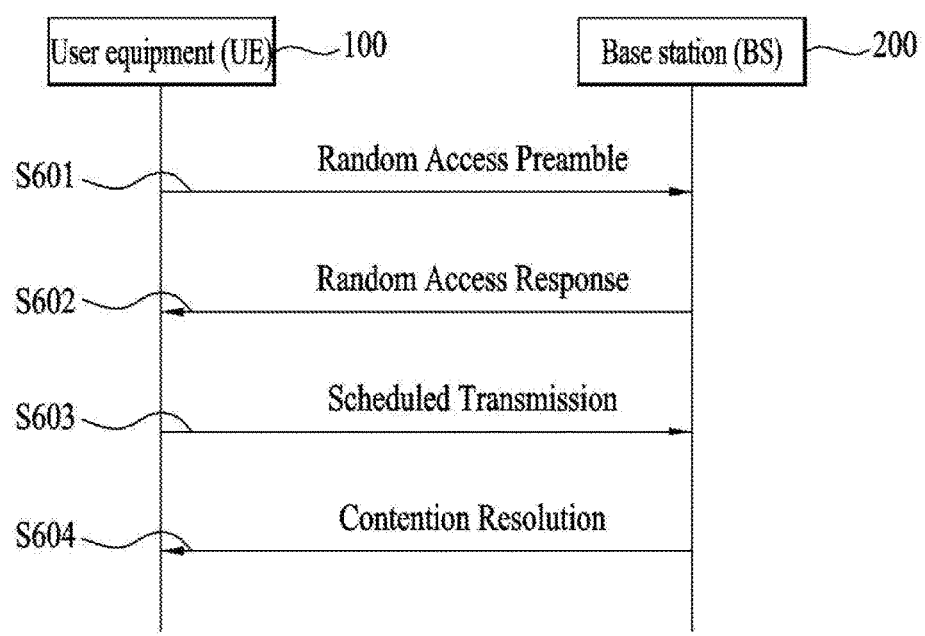
FIG. 6 is a diagram of a contention based random access procedure usable in the present invention.
Figure 7:
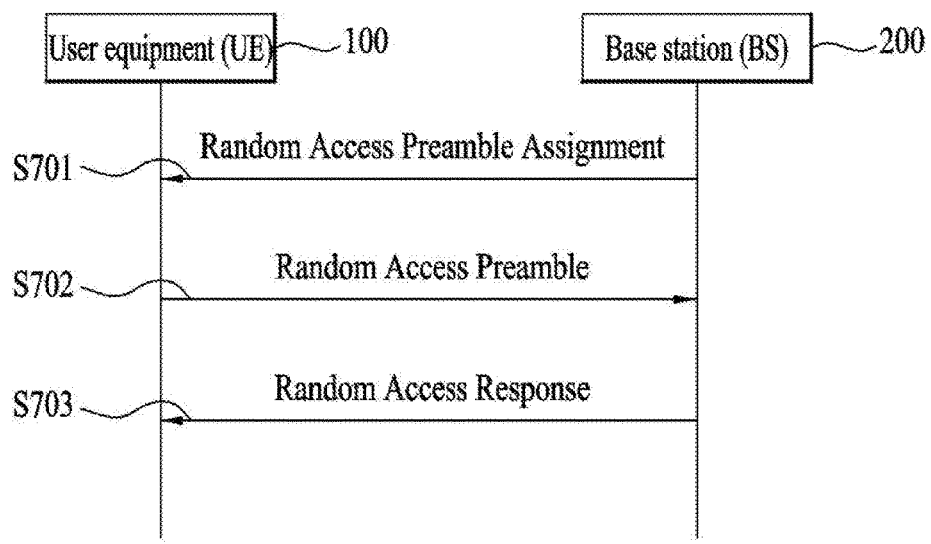
FIG. 7 is a diagram of a non-contention based random access procedure usable in the present invention.

FIGS. 6 and 7 illustrate a contention based random access procedure and a non-contention based random access procedure usable in the present invention, respectively.

Referring to FIGS. 6 and 7, a contention based random access procedure is shown in FIG. 6 and a non-contention based random access procedure is shown in FIG. 7. As shown in the drawings, the random access procedure may be divided into the contention based random access procedure and the non-contention based random access procedure.

In the case of the contention based random access procedure, a user equipment 100 randomly selects a random access channel preamble to be transmitted for access to a base station 200.

In this case, since a plurality of user equipments may select the same random access preamble at the same time and then transmit the selected random access preamble to the base station, contention resolution is required.

On the other hand, in the case of the non-contention based random access procedure shown in FIG. 7, a random access procedure is performed using a random access preamble, which is assigned only to a corresponding user equipment 100 by a base station 200. Thus, the user equipment 100 may perform the random access procedure without contention with other user equipments.

In particular, major difference between the contention based random access procedure and the non-contention based random access procedure is whether a dedicated random access preamble is assigned to a single user equipment.

In the non-contention based random access procedure, since a user equipment uses a dedicated random access preamble for the corresponding user equipment only, competition (or collision) with other user equipments may not occur. However, in the contention based random access procedure, since a user equipment use a random access preamble randomly selected by the user equipment from at least one or more random access preambles, there may be a possibility of competition.

In this case, the competition means that at least two or more user equipments intend to perform random access procedures using the same random access preamble through the same resource.

Referring back to FIG. 16, operating processes of a user equipment and a base station are described in detail with respect to the contention based random access procedure.

(1) 1$^{st}$ Message Transmission [S601]

First of all, a user equipment randomly selects a random access preamble from a set of random access preambles indicated by system information or a handover command, selects a PRACH (physical RACH) resource for carrying the random access preamble, and then transmits the random access preamble via the selected PRACH resource [S601].

(2) 2$^{nd}$ Message Reception [S602]

After the user equipment has transmitted the random access preamble in the step S601, the user equipment attempts a reception of its random access response in a random access response receiving window indicated by a base station through the system information or the handover command [S602].

In particular, the random access response information may be transmitted in format of MAC PDU. And, the MAC PDU may be carried on PDSCH (physical downlink shared channel). In order to receive the information carried on the PDSCH, the user equipment preferably monitors PDCCH (physical downlink control channel).

In particular, information on a user equipment necessary to receive the PDSCH, frequency and time information of a radio resource of the PDSCH, a transmission format of the PDSCH and the like may be preferably included in the PDCCH.

Once the user equipment succeeds in the reception of the PDCCH transmitted to the corresponding user equipment, it may appropriately receive a random access response carried on the PDSCH in accordance with the informations of the PDCCH. And, a random access preamble identifier (ID) (e.g., RAPID (random access preamble identifier), a UL grant indicating a UL radio resource, a temporary cell identifier (temporary C-RNTI), time synchronization correction value (timing advance command (TAC)) and the like can be included in the random access response.

As mentioned in the foregoing description, the random access preamble identifier is required for the random access response. Since random access response information for at least one or more user equipments may be included in one random access preamble, it may be necessary to indicate that the UL grant, the temporary cell identifier and the TAC are valid for which user equipment.

In this step, assume that the user equipment selects a random access preamble identifier matching the random access preamble selected by the user equipment in the step S602. Through this, the user equipment may be able to receive a UL grant, a temporary cell identifier (temporary C-RNTI), time synchronization correction value (timing advance command: TAC) and the like.

(3) 3$^{rd}$ Message Transmission [S603]

If the user equipment receives the random access response valid for the user equipment, it may process the informations included in the random access response. In particular, the user equipment applies the TAC and saves the temporary cell identifier. Moreover, the user equipment may be able to save data, which is to be transmitted in response to the valid random access response, in a message-3 buffer.

Meanwhile, using the received UL grant, the user equipment transmits data (i.e., a 3$^{rd}$ message) to the base station [S603].

In the contention based random access procedure, a base station is unable to determine which user equipments perform the random access procedure. In order for resolve the contention later, the base station needs to identify a user equipment.

As a method of including an identifier of a user equipment, two kinds of methods have been discussed. According to a 1$^{st}$ method, if a user equipment has a valid cell identifier already allocated by a corresponding cell prior to the random access procedure, the user equipment transmits its cell identifier via UL transmission signal corresponding to the UL grant. On the contrary, if the user equipment fails in receiving the allocation of a valid cell identifier prior to the random access procedure, the user equipment transmits its unique identifier (e.g., S-TMSI or random ID (random identifier)).

In general, the unique identifier is longer than the cell identifier. If the user equipment transmits data corresponding to the UL grant, the user equipment initiates a contention resolution timer (hereinafter abbreviated CR timer).

(4) 4$^{th}$ Message Reception [S604]

After the user equipment has transmitted the data including its identifier via the UL grant included in the random access response, the user equipment waits for an instruction from the base station for the contention resolution. In particular, the user equipment may attempt a reception of PDCCH to receive a specific message [S604].

As a method of receiving the PDCCH, two kinds of methods have been discussed. As mentioned in the foregoing description, if the 3$^{rd}$ message transmitted in response to the UL grant uses a cell identifier as its identifier, the user equipment attempts a reception of PDCCH using its cell identifier. If the identifier is a unique identifier, the user equipment may be able to attempt a reception of PDCCH using a temporary cell identifier included in the random access response.

Thereafter, in the former case, if the PDCCH is received via its cell identifier before expiration of the contention resolution timer, the user equipment determines that the random access procedure is normally performed and then ends the random access procedure.

In the latter case, if PDCCH is received via a temporary cell identifier before expiration of the contention resolution timer, the user equipment checks data carried on PDSCH indicated by the PDCCH. If the unique identifier of the user equipment is included in a content of the data, the user equipment determines that the random access procedure is normally performed and then ends the random access procedure.

Meanwhile, if a contention resolution procedure through the 3$^{rd}$ message transmission and the 4$^{th}$ message reception is not successful, the user equipment may select another random access preamble and then initiate the random access procedure again. In particular, for the contention resolution procedure, the user equipment receives the 2$^{nd}$ message from the base station, configures the 3$^{rd}$ message, and then transmits the configured 3$^{rd}$ message to the base station.

Referring to FIG. 7, in the non-contention based random access procedure, a base station 200 assigns a user equipment 100 a random access preamble that can be used by only the corresponding user equipment [S701], unlike the contention based random access procedure in FIG. 6.

The user equipment 100 performs the random access procedure using the random access preamble assigned by the base station in the step S701 [S702]. In particular, the user equipment 100 transmits the random access preamble to the base station 200 using initial transmission power or retransmission power determined in the same manner as mentioned in the foregoing description with reference to FIG. 6.

Thus, the user equipment may perform the random access procedure without collision with other user equipments unlike the contention based random access procedure mentioned with reference to FIG. 6.

In case that the user equipment 100 receives a random access response message from the base station 200 in response to the random access preamble transmitted in the step S702, connection between the user equipment and the base station is established.

Figure 8:
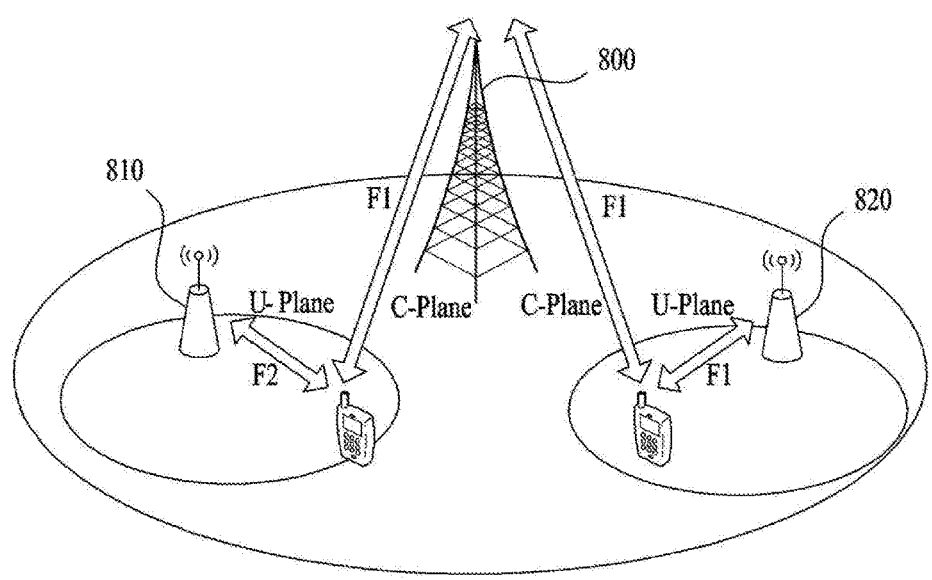
FIG. 8 is a diagram to describe a concept of dual connectivity usable in the present invention.

FIG. 8 is a diagram to describe a concept of dual connectivity usable in the present invention Referring to FIG. 8, carrier aggregation may be performed between a macro cell 810 and a small cell 820 and 830. In particular, the macro cell may use n of carriers (where n is a random positive integer) and the small cell may use k of carriers (where k is a random positive integer). In this case, carriers used in the macro cell and small cell may have the same frequency or have different frequencies. For instance, random frequencies F1 and F2 may be used in the macro cell and random frequencies F2 and F2 may be used in the small cell.

A random UE located within coverage of the small cell may be simultaneously connected to the macro cell and small cell. The UE may be served by the macro cell and small cell at the same time or be served according to TDM (time division multiplexing) scheme. Through a macro cell layer, the user equipment may be served functions provided through C-plane (e.g., connection management, mobility, etc.). In case of U-plane data path, the macro cell and/or the small cell may be selected. For instance, in case of real-time data such as VoLTE (voice over LTE), the UE may receive a service of reception/transmission from the macro cell, which is able to guarantee mobility, rather than the small cell. In case of best effort service, the user may be served by the small cell. The macro cell and small cell may be connected through backhaul and the backhaul may be ideal backhaul or non-ideal backhaul.

Moreover, the macro cell and the small cell may be equally set using one of TDD and FDD system. Alternatively, they may be differently set as TDD or FDD system.

In FIG. 8, the concept of the dual connectivity is illustrated. The macro cell and small cell may use the same frequency band or different frequency bands. A random UE having dual connectivity configured therein may be connected to the macro cell and the small cell at the same time. FIG. 8 shows a case that the small cell is set as the U-plane data path.

Although the present invention is described centering on dual connectivity of a random UE with a macro cell and a small cell for the convenience of the explanation, the present invention may not be limited by cell types (e.g., macro cell, micro cell, pico cell, femto cell, etc.). Moreover, for the convenience of the explanation, the present invention is mainly described with reference to a case that a random dual connectivity UE configures carrier aggregation (CA) by setting a macro cell to Pcell (primary cell) and a micro cell to Scell (secondary cell). However, the present invention may be applied to cases where carrier aggregation is differently configured.

Figure 9:
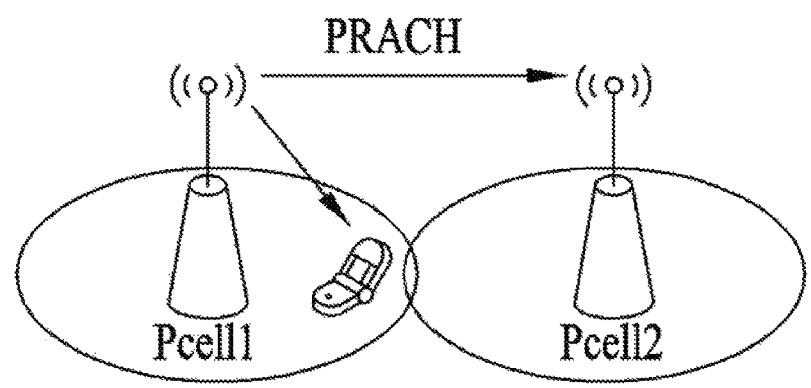
FIG. 9 is a diagram to describe a scenario of an inter-cell handover process for a user equipment to which the present invention applicable.

FIG. 9 is a diagram to describe a scenario of an inter-cell handover process for a user equipment to which the present invention applicable.

Referring to FIG. 9, if UE establishes a connection by setting Pcell 1 corresponding to a small cell to Pcell (primary cell) of carrier aggregation (CA) (It may be applied independently from deployment of a macro cell. More particularly, it may be deployed by being overlaid with the macro cell or by not being overlaid with the macro cell), the UE may move from the Pcell 1 to a different cell, Pcell 2 and then perform a handover procedure from the Pcell 1 into Pcell 2.

In this case, to perform handover, the UE needs to perform uplink synchronization by obtaining a timing advance (TA) value between the UE and the Pcell 2 corresponding to a target base station. According to the present invention, the UE may obtain a timing advance (TA) value between the Pcell 1 corresponding to a source base station and the Pcell 2 corresponding to the target base station through a specific message and the like.

In this case, if the UE performs the handover using the timing advance (TA) value between the Pcell 1 and Pcell 2 obtained through the specific message and the like, the UE may omit a process for obtaining a timing advance (TA)

value from the Pcell 2 in a manner of performing PRACH (physical random access channel) transmission to the Pcell 2 corresponding to the target base station for the handover and UL synchronization.

Figure 10:
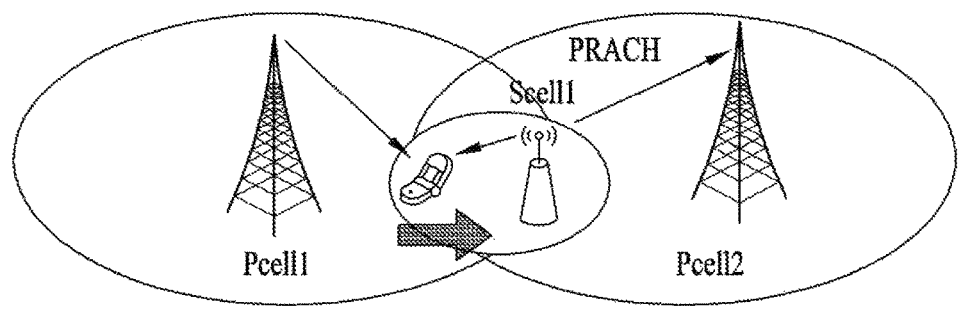
FIG. 10 is a diagram to describe a scenario of an inter-macro cell handover process for a dual connectivity user equipment to which the present invention is applicable.

FIG. 10 is a diagram to describe a scenario of an inter-macro cell handover process for a dual connectivity user equipment to which the present invention is applicable.

In case that a small cell is located at edges of two random macro cells, if a user equipment simultaneously connected to one macro cell (Pcell 1) and the small cell (Scell 1), i.e., a dual connectivity user equipment moves, a handover procedure from the connected macro cell (Pcell 1) into another macro cell (Pcell 2) may be performed. In particular, as shown in FIG. 10, if a dual connectivity UE simultaneous connected to the Pcell 1 and Scell 1 moves to the Pcell 2, the UE may perform the handover procedure from the Pcell 1 into the Pcell 2.

In this case, to perform the handover, the UE needs to perform uplink synchronization by obtaining a timing advance (TA) value between the UE and the Pcell 2 corresponding to a target base station. According to the present invention, the UE may obtain a timing advance (TA) value between the Scell 1 and Pcell 2 through a message from the Pcell 1 (or Scell 1).

In this case, if the UE performs the handover using the timing advance (TA) value between the Pcell 1 (or Scell 1) and Pcell 2 obtained through the message, the UE may omit a process for obtaining a timing advance (TA) value from the Pcell 2 in a manner of performing PRACH transmission to the Pcell 2 corresponding to the target base station for the handover and UL synchronization.

Figure 11:
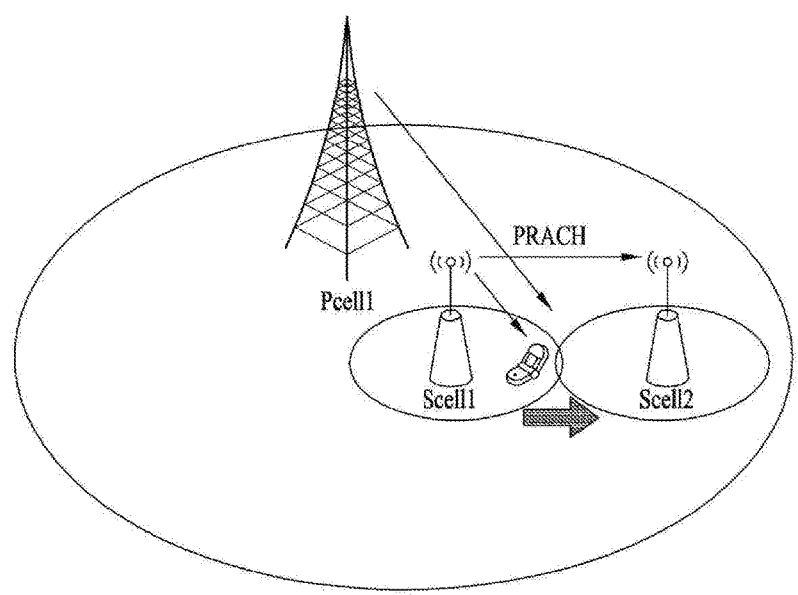
FIG. 11 is a diagram to describe a scenario of an inter-small cell handover process for a dual connectivity user equipment to which the present invention is applicable.

FIG. 11 is a diagram to describe a scenario of an inter-small cell handover process for a dual connectivity user equipment to which the present invention is applicable.

Referring to FIG. 11, in a situation that a macro cell and a small cell is overlaid with each other, if a dual connectivity UE simultaneously connected the macro cell and small cell moves, the UE may be connected to another small cell.

In particular, such a Scell addition process may be performed. If Scell is activated and the connected Pcell and the Scell belongs to different TA (timing advance) groups, i.e., the Scell corresponds to sTA (secondary timing advance) group, the dual connectivity UE may perform a non-contention based random access procedure in order to perform UL synchronization with the Scell in general.

For instance, as shown in FIG. 11, if the dual connectivity UE connected to Pcell 1 and Scell 1 at the same time moves to Scell 2, the Scell 2 may be added according to measurement of the dual connectivity UE. If the Scell 2 is activated and belongs to sTA group, the UE may perform a random access procedure on the Scell 2.

In this case, according to the present invention, the UE may obtain a timing advance (TA) value between the Scell 1 and Scell 2 through a message from the Pcell 1 (or Scell 1, Scell 2)

In this case, if the UE uses the timing advance (TA) value between the Scell 1 and Scell 2 obtained through the message, it is not necessary for the UE to receive a random access preamble assignment message from the Pcell 1 (or Scell 1, Scell 2), to transmit a random access preamble message, and to receive a random access response message to obtain the timing advance (TA) value.

On the other hand, in case that a small cell is fixed, there is almost no change in a timing advance (TA) value. Thus, if a timing advance (TA) value between the small cell and a specific cell is obtained in a manner that the small cell transmits PRACH to the specific cell, small amount of resources may be used compared to a case that each of nearby UEs transmits PRACH. Moreover, in aspect of a user equipment, since a previously obtained timing advance (TA) value may be directly used without a separate process for a connection to a target base station, much faster handover or Scell addition may be performed compared to a case that a user equipment performs uplink synchronization through direct PRACH transmission.

As mentioned in the foregoing description with reference to FIGS. 9 to 11, it is proposed in the present invention that when a user equipment intends to perform handover to a target base station or a Scell addition process, the user equipment receives a TA value obtained by a base station and then performs uplink synchronization using the TA value.

Meanwhile, in order to transmit PRACH to neighbor cells, a small cell needs to receive downlink frequency bands used by the neighbor cells and to transmit signals using the downlink frequency bands used by the neighbor cells. For example, in case that the small cell is connected to the neighbor cells through backhaul, it may be applied.

In the foregoing description of the present invention, it is explained that a small cell (or macro cell) obtains a TA value. However, the present invention is not limited by cell types. Moreover, the present invention may be applied to a relay, an egg and the like as well as to the cell.

Figure 12:
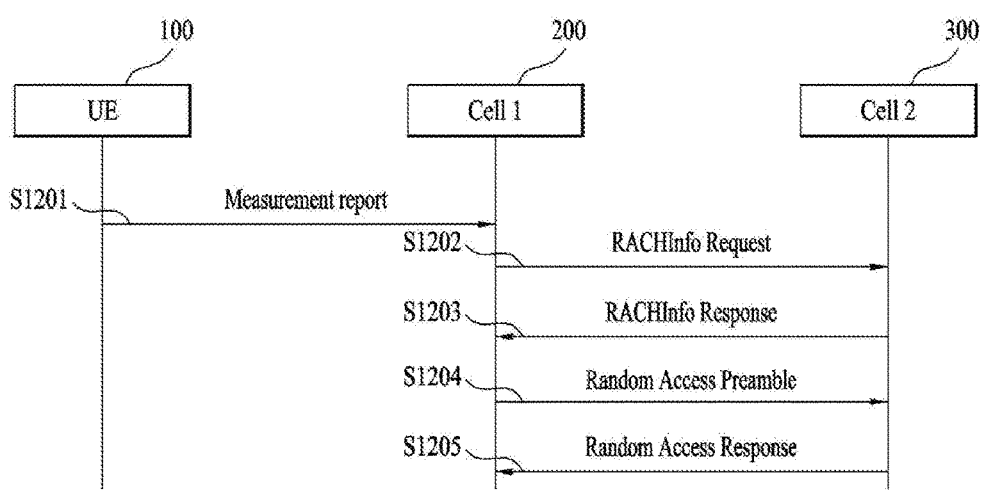
FIG. 12 is a diagram to describe a process for a serving base station to receive information necessary for a user equipment to perform a random access procedure from a different base station according to one embodiment of the present invention.

FIG. 12 is a diagram to describe a process for a serving base station to receive information necessary for a user equipment to perform a random access procedure from a different base station according to one embodiment of the present invention.

There may be a plurality of trigger conditions that make a small cell to perform PRACH transmission to a specific neighbor cell.

If a UE connected to a small cell detects a new neighbor cell, the UE may make a measurement report to the small cell (or macro cell). In this case, if SON (self-organization network) operates, the small cell (or macro cell) may update the new neighbor cell on a neighbor relation table or a neighbor cell list.

If the small cell (or macro cell) does not know a timing advance (TA) value between the small cell and a specific cell after receiving the measurement report from the UE, the small cell may transmit PRACH to the neighbor specific cell.

Referring to FIG. 12, UE 100 served by cell 1 200 corresponding its serving cell detects cell 2 300 and then transmits a measurement report for the cell 2 300 to the cell 1 200 [S1201].

Having received the measurement report message, the cell 1 200 measures frequency of the cell 2 300 if the cell 1 200 does not know a timing advance (TA) value between the cell 1 200 and cell 2 300 or the cell 2 300 is not included in its neighbor cell list. Thereafter, the cell 1 200 may obtain information on downlink synchronization (DL sync) with the cell 2 300 and system information.

Subsequently, the cell 1 200 transmits RACHInfo request message to the cell 2 300 [S1202]. The RACHInfo request message may include a message type (e.g., indicator for indicating whether the corresponding message is the RACHInfo request message), PCID (or GCID) of the cell 1 200, PCID (or GCID) of the cell 2 300, and the like. The RACHInfo request message may be transmitted using backhaul (including air-interface backhaul) through X2 interface between the cell 1 200 and cell 2 300.

Having received the RACHInfo request message from the cell 1 200, the cell 2 300 may transmit RACHInfo response message to the cell 1 200 [S1203].

The RACHInfo response message may include a message type (e.g., indicator for indicating whether the corresponding message is the RACHInfo response message), PCID (or GCID) of the cell 1 200, PCID (or GCID) of the cell 2 300, PRACH configuration information (i.e., this information is transmitted for UE by a base station and includes existing system information and mobility control information) and the like. The RACHInfo response message may be transmitted using backhaul (including air-interface backhaul) through X2 interface between the cell 1 200 and cell 2 300.

Having received the RACHInfo response message, the cell 1 200 may obtain information on PRACH related preamble and resources in the cell 2 300. Through this, the cell 1 200 may transmit a random access preamble to the cell 2 300 [S1204].

In this case, the cell 1 200 may transmit a contention based random access preamble or a non-contention base random access preamble depending on a PRACH configuration message transmitted by the cell 2 300.

Moreover, to recognize that the cell 1 200 corresponds to not a user equipment but a base station, the cell 2 300 may use a method of transmitting a dedicated preamble to the cell 1 200.

If the cell 2 300 detects the random access preamble transmitted by the cell 1 200, the cell 2 300 may calculate a timing advance (TA) value between the cell 1 200 and cell 2 300. Subsequently, the cell 2 300 may include the calculated TA value in a random access response message and then transmit the random access response message to the cell 1 200. In this case, in order for the cell 2 300 to transmit the random access response message to the cell 1 200, the following several methods may be used.

Similar to the conventional random access procedure, the cell 2 300 may transmit through a common search space DL grant on which CRC masking is performed using an RA-RNTI value determined in accordance with the resource transmitted by the cell 1 200.

And, the cell 2 300 may transmit the timing advance (TA) value between the cell 1 200 and cell 2 300 as 6 bits through PDSCH assigned by DL grant in the same manner as that used in the conventional random access procedure.

Moreover, the cell 1 200 may obtain the timing advance (TA) value in a manner of receiving the PDSCH assigned by the DL grant on which the CRC masking is performed using the RA-RNTI value.

Furthermore, the cell 2 300 may transmit the random access response message to the cell 1 200 using backhaul through X2 interface. The random access response message may include a message type (e.g., indicator for indicating whether the corresponding message is the random access response message), PCID (or GCID) of the cell 1 200, PCID (or GCID) of the cell 2 300, the TA (timing advance) value (i.e., it may be transmitted as 6 bits) and the like.

Meanwhile, if the cell 1 200 receives the random access response message from the cell 2 300 to which the cell 1 200 has transmitted the random access preamble, the cell 1 200 may know the timing advance (TA) value between the cell 1 200 and cell 2 300.

According to the present invention, a user equipment may use a timing advance (TA) value between cell 1 and cell 2 obtained by the cell 1.

Figure 13:
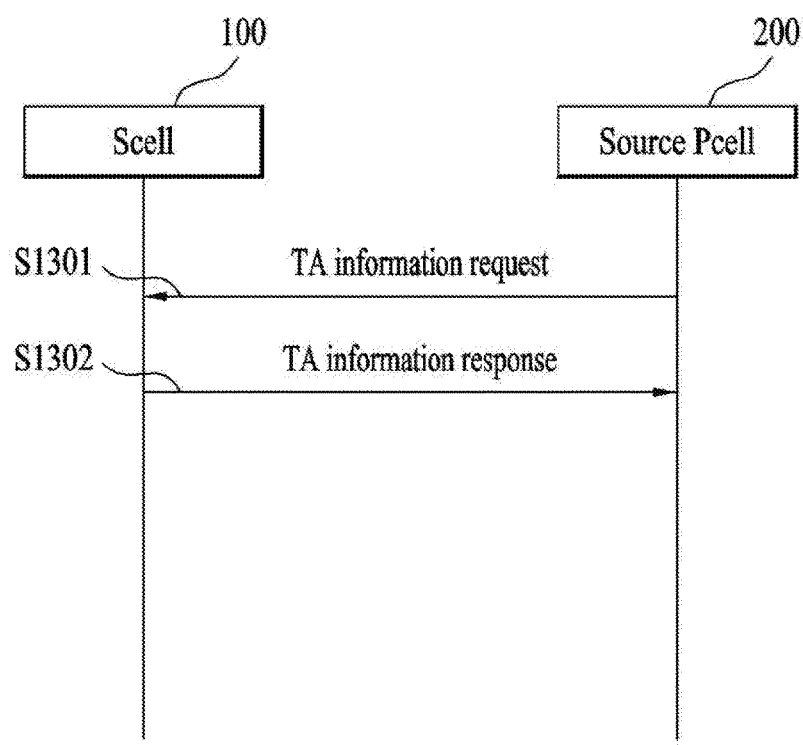
FIG. 13 is a diagram to describe a process for a serving base station to receive information necessary for a user equipment to perform a random access procedure from a different base station according to one embodiment of the present invention.

FIG. 13 is a diagram to describe a process for a serving base station to receive information necessary for a user equipment to perform a random access procedure from a different base station according to one embodiment of the present invention.

If a user equipment dual-connected to a source Pcell and a Scell moves from the source Pcell to a target Pcell, the user equipment may need to perform handover of connection with the source Pcell to the target Pcell.

According to one embodiment of the present invention, if the number of UEs that need to perform the above-mentioned handover is large (e.g., the number of user equipments that perform handover from the source Pcell to the target Pcell per hour is equal to or greater than a predetermined specific threshold value), a small cell (e.g., source Pcell, cell located at edges of the source Pcell and the target Pcell, etc.) connected to the user equipment may transmit PRACH to the target Pcell.

For example, if the number of UEs performing handover procedures from cell 1 into cell 2 as shown in FIG. 9 is large, the cell 1 may perform a procedure for transmitting PRACH to the cell 2. Such a procedure may be processed similar to the process for transmission of the RACHInfo request message from the cell 1 to the cell 2 and later processes in the procedure mentioned in the foregoing description with reference to FIG. 12.

Moreover, for instance, if dual connectivity UE simultaneously connected to Pcell 1 and Scell 1 moves to Pcell 2 as shown in FIG. 10, the dual connectivity UE may need to perform handover of connection with the Pcell 1 to the Pcell 2. If there are a number of dual connectivity UEs performing the above-mentioned handover, the Scell 1 may perform a procedure for transmitting PRACH to the Pcell 2.

In this case, the source Pcell 1 may or may not be aware of the fact that the Scell 1 obtains a TA value between the Scell 1 and target Pcell 2 or TA value between the Scell 1 and target Pcell 2. Since the source Pcell 1 determines whether to perform the handover procedure, the source Pcell 1 may trigger PRACH transmission in the Scell 1 depending on the number of dual connectivity UEs, which are simultaneously connected to the source Pcell 1 and Scell 1, performing the handover into the target Pcell 2.

In this case, if the source Pcell 1 is not aware of the fact that the Scell 1 obtains the TA value between the Scell 1 and target Pcell 2 or TA value between the Scell 1 and target Pcell 2, it may require a procedure for checking whether the Scell 1 is aware of the TA value between the Scell 1 and target Pcell 2. Thus, the procedure for the source Pcell 1 to check TA information of the Scell 1 may be added before the PRACH transmission in the Scell 1.

Referring back to FIG. 13, source Pcell 1 200 may check whether the Scell 1 100 is aware of a TA value between the Scell 1 100 and target Pcell 2 by transmitting a TA information request message to Scell 1 100 additionally [S1301].

The TA information request message may include a message type (e.g., indicator for indicating whether the corresponding message is the TA information request message), PCID (or GCID) of the Scell 1, PCID (or GCID) of the source Pcell 1, PCID (or GCID) of the target Pcell 2 and the like. The TA information request message may be transmitted through backhaul (including air-interface backhaul) using X2 interface between the Scell 1 and source Pcell 1.

Having received the TA information request message, the Scell 1 transmits a TA information response message to the source Pcell 1 [S1302]. The TA information response message may include a message type (e.g., indicator for indicating whether the corresponding message is the TA information response message), PCID (or GCID) of the Scell 1, PCID (or GCID) of the source Pcell 1, PCID (or GCID) of the target Pcell 2, the TA value (or information for indicating whether the Scell 1 is aware of the TA value) and the like. The TA information response message may be transmitted through backhaul (including air-interface backhaul) using X2 interface between the Scell 1 and source Pcell 1.

Having received the TA information response message, the source Pcell 1 may know whether the Scell 1 is aware of the TA value between the Scell 1 and target Pcell 2 (or the TA value). In the above-mentioned TA information response message, PCID (or GCID) of the target Pcell 2 may be omitted. In this case, having received the TA information request message, the Scell 1 may transmit all TA values of respective cells, which the Scell 1 knows, to the source Pcell 1. In particular, the TA information response message may include the message type (e.g., indicator for indicating whether the corresponding message is the TA information response message), PCID (or GCID) of the Scell 1, PCID (or GCID) of the source Pcell 1, {PCID (or GCID) of a random cell of which TA the Scell 1 knows, a TA value between the Scell 1 and random cell (or information for indicating whether the Scell 1 is aware of the TA value)} and the like.

The TA information response message may be transmitted through backhaul using X2 interface between the Scell 1 and source Pcell 1. Having received the TA information response message, the source Pcell 1 may know whether the Scell 1 is aware of the TA value between the Scell 1 and random cell. Particularly, the source Pcell 1 may know the TA value between the Scell 1 and target Pcell 2 or may know whether the Scell 1 is aware of the TA value between the Scell 1 and target Pcell 2.

If the Scell 1 does not know the TA value between the Scell 1 and Pcell 2, the Scell 1 or source Pcell 1 may enable the Scell 1 to perform a procedure for transmitting PRACH to the target Pcell 2. In this case, the TA information request message may be substituted with a random access request message explained in the following description.

Figure 14:
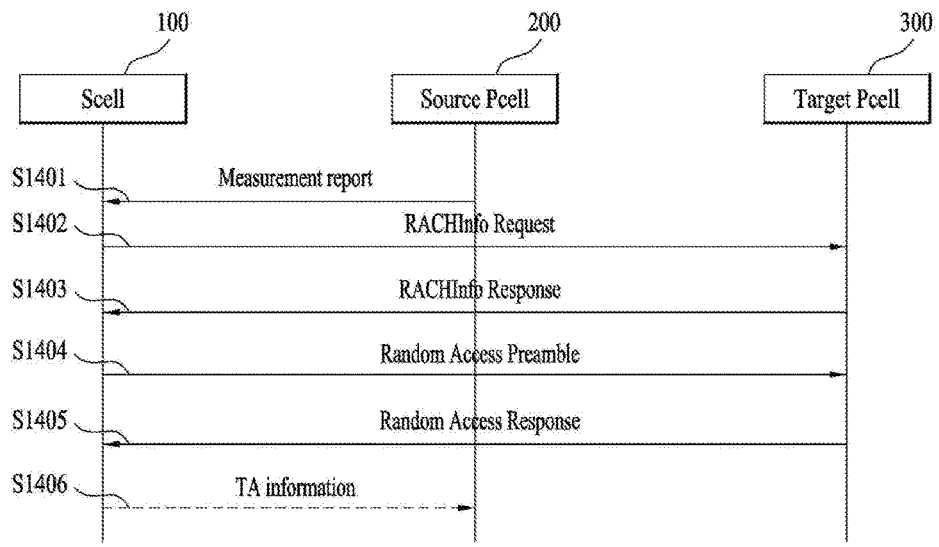
FIG. 14 is a diagram to describe a process for a serving base station to receive information necessary for a user equipment to perform a random access procedure from a different base station according to one embodiment of the present invention.

FIG. 14 is a diagram to describe a process for a serving base station to receive information necessary for a user equipment to perform a random access procedure from a different base station according to one embodiment of the present invention.

Referring to FIG. 14, in a situation that a user equipment is dual-connected to source Pcell 200 and Scell 100, there may be a case that X2 interface exists between the Scell 100 and a target Pcell 300.

In particular, if there is the X2 interface between the Scell 100 and target Pcell 300, it may operates similar to the process for transmission of the RACHInfo request message from the cell 1 to the cell 2 and later processes in the procedure mentioned in the foregoing description with reference to FIG. 12.

The source Pcell 200 may know whether the Scell 100 is aware of a TA value between the Scell 100 and target Pcell 300 through the aforementioned TA information request and response procedures with the Scell.

If the Scell 100 is not aware of the TA value between the Scell 100 and target Pcell 300, the source Pcell 200 may transmit a random access request message to the Scell 100 [S1401].

The random access request message may include a message type (e.g., indicator for indicating whether the corresponding message is the random access request message), PCID (or GCID) of the Scell 100, PCID (or GCID) of the source Pcell 200, PCID (or GCID) of the target Pcell 300, and the like. The random access request message may be transmitted through backhaul using the X2 interface between the Scell 100 and source Pcell 200.

Having received the random access request message, the Scell 100 may perform a procedure for transmitting PRACH to the target Pcell 300. The PRACH transmission procedure may be performed according to the procedure mentioned with reference to FIG. 12 [S1402 to S1405]. Having performed the above procedure, the Scell 100 may know the TA value between the Scell 100 and target Pcell 300.

If the source Pcell 200 corresponds to a subject of managing the TA value between the Scell 100 and target Pcell 300, the Scell 100 may perform the steps S1402 to S1405 mentioned with reference to FIG. 12 and then transmit the TA value received through the random access response to the source Pcell 200 through a TA information message [S1406].

The TA information message may include a message type (e.g., indicator for indicating whether the corresponding message is the TA information message), PCID (or GCID) of the Scell 100, PCID (or GCID) of the source Pcell 200, PCID (or GCID) of the target Pcell 300, the TA value, and the like.

Having received the TA information message, the source Pcell 200 may know the TA value between the Scell 100 and target Pcell 300. And, when determining whether to perform handover of the dual connectivity UE into the target Pcell 300, the source Pcell 200 may transmit the obtained TA value to the dual connectivity UE.

Figure 15:
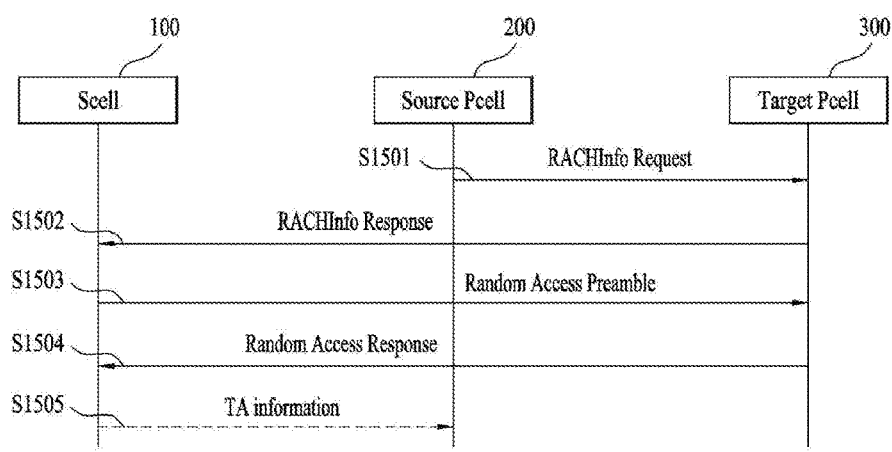
FIG. 15 is a diagram to describe a process for a serving base station to receive information necessary for a user equipment to perform a random access procedure from a different base station according to one embodiment of the present invention.

FIG. 15 is a diagram to describe a process for a serving base station to receive information necessary for a user equipment to perform a random access procedure from a different base station according to one embodiment of the present invention.

If a user equipment dual-connected to source Pcell 200 and Scell 100 moves from the source Pcell 200 to target Pcell 300, the user equipment may need to perform handover of connection with the source Pcell 200 to the target Pcell 300.

In this case, according to one embodiment of the present invention, if the number of UEs that need to perform the above-mentioned handover is large (e.g., the number of user equipments that perform handover from the source Pcell 200 to the target Pcell 300 per hour is equal to or greater than a predetermined specific threshold value), the source Pcell 200 may transmit to the target Pcell 300 the RACHInfo request message mentioned in the foregoing description with reference to FIG. 12 [S1501].

The RACHInfo request message may include a message type (e.g., indicator for indicating whether the corresponding message is the RACHInfo request message), PCID (or GCID) of the source Pcell 200, PCID (or GCID) of the target Pcell 300, PCID (or GCID) of the Scell 100 and the like. The RACHInfo request message may be transmitted using backhaul (including air-interface backhaul) through X2 interface between the source Pcell 200 and target Pcell 300.

Having received the RACHInfo request message from the source Pcell 200, the target Pcell 300 may transmit RACHInfo response message to the Scell 100 [S1502].

The RACHInfo response message may include a message type (e.g., indicator for indicating whether the corresponding message is the RACHInfo response message), PCID (or GCID) of the target Pcell 300, PCID (or GCID) of the source Pcell 200, PCID (or GCID) of the Scell 100, PRACH configuration (i.e., as information transmitted for UE by a base station, it may include existing system information and mobility control information) and the like.

The RACHInfo response message may be transmitted using backhaul (including air-interface backhaul) through X2 interface between the target Pcell 300 and Scell 100.

Having received the RACHInfo response message, the Scell 100 may obtain information on PRACH related preamble and resources in the target Pcell 300. Through this, the Scell 100 may transmit a random access preamble to the target Pcell 300 [S1503].

In this case, the Scell 100 may transmit a contention based random access preamble or a non-contention base random access preamble depending on a PRACH configuration message transmitted by the target Pcell 300.

If the target Pcell 300 receives the random access preamble transmitted by the Scell 100, the target Pcell 300 may calculate a timing advance (TA) value between the Scell 100 and target Pcell 300. Subsequently, the target Pcell 300 may include the calculated TA value in a random access response message and then transmit the random access response message to the Scell 100 [S1504].

Meanwhile, if the Scell 100 receives the random access response message from the target Pcell 300 to which the Scell 100 has transmitted the random access preamble, the Scell 100 may know the timing advance (TA) value between the Scell 100 and target Pcell 300.

If the source Pcell 200 corresponds to a subject of managing the TA value between the Scell 100 and target Pcell 300, the Scell 100 may perform the steps S1503 to S1504 and then transmit the TA value received through the random access response to the source Pcell 200 through a TA information message [S1505]. The TA information message may include a message type (e.g., indicator for indicating whether the corresponding message is the TA information message), PCID (or GCID) of the Scell 100, PCID (or GCID) of the target Pcell 300, PCID (or GCID) of the source Pcell 200, the TA value, and the like.

Having received the TA information message, the source Pcell 200 may know the TA value between the Scell 100 and target Pcell 300. And, when determining whether to perform handover of the dual connectivity UE into the target Pcell 300, the source Pcell 200 may transmit the obtained TA value to the dual connectivity UE.

Figure 16:
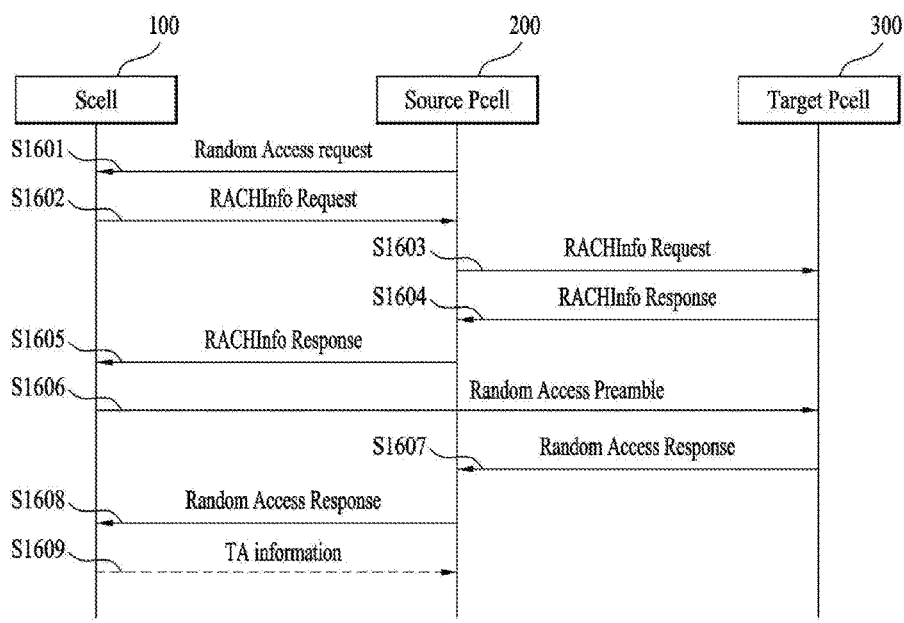
FIG. 16 is a diagram to describe a process for a serving base station to receive information necessary for a user equipment to perform a random access procedure from a different base station according to one embodiment of the present invention.

FIG. 16 is a diagram to describe a process for a serving base station to receive information necessary for a user equipment to perform a random access procedure from a different base station according to one embodiment of the present invention.

Referring to FIG. 16, in a situation that a user equipment is dual-connected to source Pcell 200 and Scell 100, there may be a case that X2 interface does not exist between the Scell 100 and a target Pcell 300.

Comparing the case mentioned with reference to FIG. 14, i.e., the case that X2 interface exists between the Scell 100 and target Pcell 300 with a case in FIG. 16 in which X2 interface does not exist between the Scell 100 and target Pcell 300, most of the operations are similar to each other. However, In FIG. 14, messages are directly transmitted through X2 interface between the Scell 100 and target Pcell 300 whereas in FIG. 16, messages cannot be directly transmitted between the Scell 100 and target Pcell 300 but should be transmitted through the source Pcell 200. Configurations of the messages may be identical or similar to those of the above-mentioned messages.

More particularly, if a user equipment dual-connected to the source Pcell 200 and Scell 100 moves from the source Pcell 200 to target Pcell 300, the user equipment may need to perform handover of connection with the source Pcell 200 to the target Pcell 300. Moreover, there may be no X2 interface between the Scell 100 and target Pcell 300.

In this case, according to one embodiment of the present invention, if the number of UEs that need to perform the above-mentioned handover is large (e.g., the number of user equipments that perform handover from the source Pcell 200 to the target Pcell 300 per hour is equal to or greater than a predetermined specific threshold value), the source Pcell 200 may transmit a random access request message to the Scell 100 [S1601].

The random access request message may include a message type (e.g., indicator for indicating whether the corresponding message is the random access request message), PCID (or GCID) of the Scell 100, PCID (or GCID) of the source Pcell 200, PCID (or GCID) of the target Pcell 300, and the like. The random access request message may be transmitted through backhaul using the X2 interface between the Scell 100 and source Pcell 200.

Having received the random access request message, the Scell 100 should perform a procedure for transmitting PRACH to the target Pcell 300. However, since the X2 interface between the Scell 100 and target Pcell 300 does not exist, the Scell 100 transmits RACHInfo request message to the source Pcell 200 [S1602].

Having received the RACHInfo request message from the Scell 100, the source Pcell 200 may forward the received RACHInfo request message to the target Pcell 300 [S1603].

Having received the RACHInfo request message from the source Pcell 200, the target Pcell 300 should transmit RACHInfo response message to the Scell 100. However, since the X2 interface between the Scell 100 and target Pcell 300 does not exist, the target Pcell 300 transmits RACHInfo response message to the source Pcell 200 [S1604].

The RACHInfo response message may include a message type (e.g., indicator for indicating whether the corresponding message is the RACHInfo response message), PCID (or GCID) of the target Pcell 300, PCID (or GCID) of the source Pcell 200, PCID (or GCID) of the Scell 100, PRACH configuration (i.e., as information transmitted for UE by a base station, it may include existing system information and mobility control information) and the like.

Having received the RACHInfo response message, the source Pcell 200 may forward the received RACHInfo response message to the Scell 100 [S1605].

Message transmission between the source Pcell 200 and Scell 100 and between the source Pcell 200 and target Pcell 300 may be performed using backhaul (including air-interface backhaul) through X2 interface.

Having received the RACHInfo response message, the Scell 100 may obtain information on PRACH related preamble and resources in the target Pcell 300. Through this, the Scell 100 may transmit a random access preamble to the target Pcell 300 [S1606].

In this case, the Scell 100 may transmit a contention based random access preamble or a non-contention base random access preamble depending on a PRACH configuration message, which is transmitted from the target Pcell 300 and received through the source Pcell 200.

Meanwhile, if the target Pcell 300 receives the random access preamble transmitted by the Scell 100, the target Pcell 300 may calculate a timing advance (TA) value between the Scell 100 and target Pcell 300. The target Pcell 300 may transmit a random access response message to the Scell 100 in a manner of including the calculated TA value in the random access response message. However, since the X2 interface between the Scell 100 and target Pcell 300 does not exist, the target Pcell 300 transmits the random access response message to the source Pcell 200 [S1607].

The source Pcell 200 forwards the received random access response message to the Scell 100 [S1608].

If the Scell 100 receives the random access response message, which is transmitted by the target Pcell 300, through the source Pcell 200, the Scell 100 may be aware of the timing advance (TA) value between the Scell 100 and target Pcell 300.

If the source Pcell 200 corresponds to a subject of managing the TA value between the Scell 100 and target Pcell 300, the Scell 100 may perform the steps S1602 to S1608 and then transmit the TA value received through the random access response to the source Pcell 200 through a TA information message [S1609]. The TA information message may include a message type (e.g., indicator for indicating whether the corresponding message is the TA information message), PCID (or GCID) of the Scell 100, PCID (or GCID) of the target Pcell 300, PCID (or GCID) of the source Pcell 200, the TA value and the like.

Having received the TA information message, the source Pcell 200 may know the TA value between the Scell 100 and target Pcell 300. And, when determining whether to perform handover of the dual connectivity UE into the target Pcell 300, the source Pcell 200 may transmit the obtained TA value to the dual connectivity UE.

Figure 17:
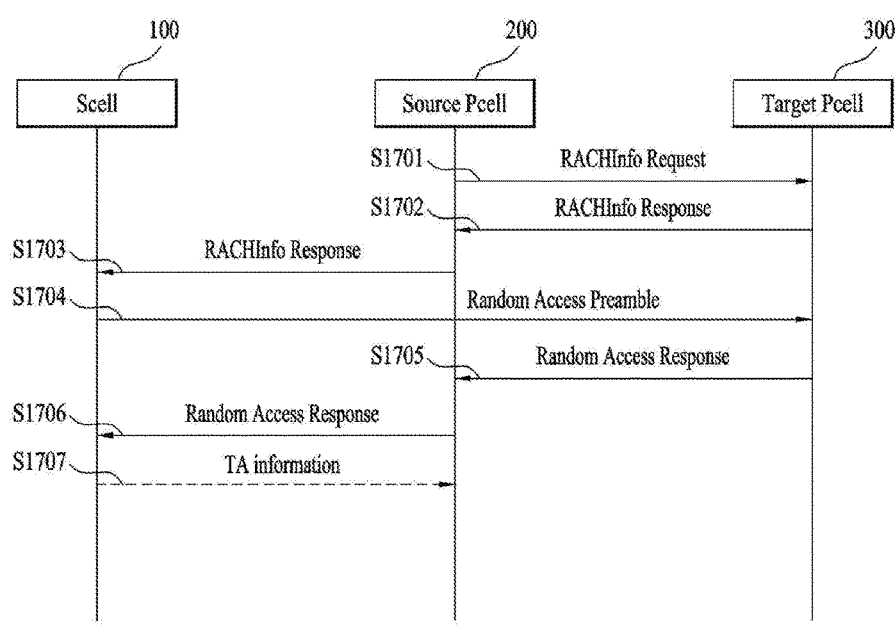
FIG. 17 is a diagram to describe a process for a serving base station to receive information necessary for a user equipment to perform a random access procedure from a different base station according to one embodiment of the present invention.

FIG. 17 is a diagram to describe a process for a serving base station to receive information necessary for a user equipment to perform a random access procedure from a different base station according to one embodiment of the present invention.

Referring to FIG. 17, in a situation that a user equipment is dual-connected to source Pcell 200 and Scell 100, there may be a case that X2 interface does not exist between the Scell 100 and a target Pcell 300.

Comparing the case mentioned with reference to FIG. 15, i.e., the case that X2 interface exists between the Scell 100 and target Pcell 300 with a case in FIG. 17 in which X2 interface does not exist between the Scell 100 and target Pcell 300, most of the operations are similar to each other. However, In FIG. 15, messages are directly transmitted through X2 interface between the Scell 100 and target Pcell 300 whereas in FIG. 17, messages cannot be directly transmitted between the Scell 100 and target Pcell 300 but should be transmitted through the source Pcell 200. Configurations of the messages may be identical or similar to those of the above-mentioned messages.

More particularly, if a user equipment dual-connected to the source Pcell 200 and Scell 100 moves from the source Pcell 200 to target Pcell 300, the user equipment may need to perform handover of connection with the source Pcell 200 to the target Pcell 300. Moreover, there may be no X2 interface between the Scell 100 and target Pcell 300.

In this case, according to one embodiment of the present invention, if the number of UEs that need to perform the above-mentioned handover is large (e.g., the number of user equipments that perform handover from the source Pcell 200 to the target Pcell 300 per hour is equal to or greater than a predetermined specific threshold value), the source Pcell 200 may transmit to the target Pcell 300 the RACHInfo request message mentioned in the foregoing description [S1701].

The RACHInfo request message may include a message type (e.g., indicator for indicating whether the corresponding message is the RACHInfo request message), PCID (or GCID) of the source Pcell 200, PCID (or GCID) of the target Pcell 300, PCID (or GCID) of the Scell 100 and the like. The RACHInfo request message may be transmitted using backhaul (including air-interface backhaul) through X2 interface between the source Pcell 200 and target Pcell 300.

If the target Pcell 300 receives the RACHInfo request message from the source Pcell 200, the target Pcell 300 may transmit RACHInfo response message to the Scell 100. However, since X2 interface does not exist between the target Pcell 300 and Scell 100, the target Pcell 300 may transmit the RACHInfo response message to the source Pcell 200 instead of directly transmitting the RACHInfo response message to the Scell 100.

The RACHInfo response message may include a message type (e.g., indicator for indicating whether the corresponding message is the RACHInfo response message), PCID (or GCID) of the target Pcell 300, PCID (or GCID) of the source Pcell 200, PCID (or GCID) of the Scell 100, PRACH configuration (i.e., as information transmitted for UE by a base station, it may include existing system information and mobility control information) and the like.

Having received the RACHInfo response message from the target Pcell 300, the source Pcell 200 may forward the received RACHInfo response message to Scell 100 [S1703].

Having received the RACHInfo response message, the Scell 100 may obtain information on PRACH related preamble and resources in the target Pcell 300. Through this, the Scell 100 may transmit a random access preamble to the target Pcell 300 [S1704].

In this case, the Scell 100 may transmit a contention based random access preamble or a non-contention base random access preamble depending on a PRACH configuration message, which is transmitted from the target Pcell 300 and received through the source Pcell 200.

If the target Pcell 300 receives the random access preamble transmitted by the Scell 100, the target Pcell 300 may calculate a timing advance (TA) value between the Scell 100 and target Pcell 300. The target Pcell 300 may transmit a random access response message to the Scell 100 in a manner of including the calculated TA value in the random access response message. However, since the X2 interface between the Scell 100 and target Pcell 300 does not exist, the target Pcell 300 transmits the random access response message to the source Pcell 200 [S1705].

Having received the random response message from the target Pcell 300, the source Pcell 200 forwards the received random access response message to the Scell 100 [S1706].

Meanwhile, if the Scell 100 receives the random access response message, which is transmitted by the target Pcell 300, through the source Pcell 200, the Scell 100 may be aware of the timing advance (TA) value between the Scell 100 and target Pcell 300.

If the source Pcell 200 corresponds to a subject of managing the TA value between the Scell 100 and target Pcell 300, the Scell 100 may perform the steps S1704 to S1706 and then transmit the TA value received through the random access response to the source Pcell 200 through a TA information message [S1707]. The TA information message may include a message type (e.g., indicator for indicating whether the corresponding message is the TA information message), PCID (or GCID) of the Scell 100, PCID (or GCID) of the target Pcell 300, PCID (or GCID) of the source Pcell 200, the TA value and the like.

Having received the TA information message, the source Pcell 200 may know the TA value between the Scell 100 and target Pcell 300. And, when determining whether to perform handover of the dual connectivity UE into the target Pcell 300, the source Pcell 200 may transmit the obtained TA value to the dual connectivity UE.

Figure 18:
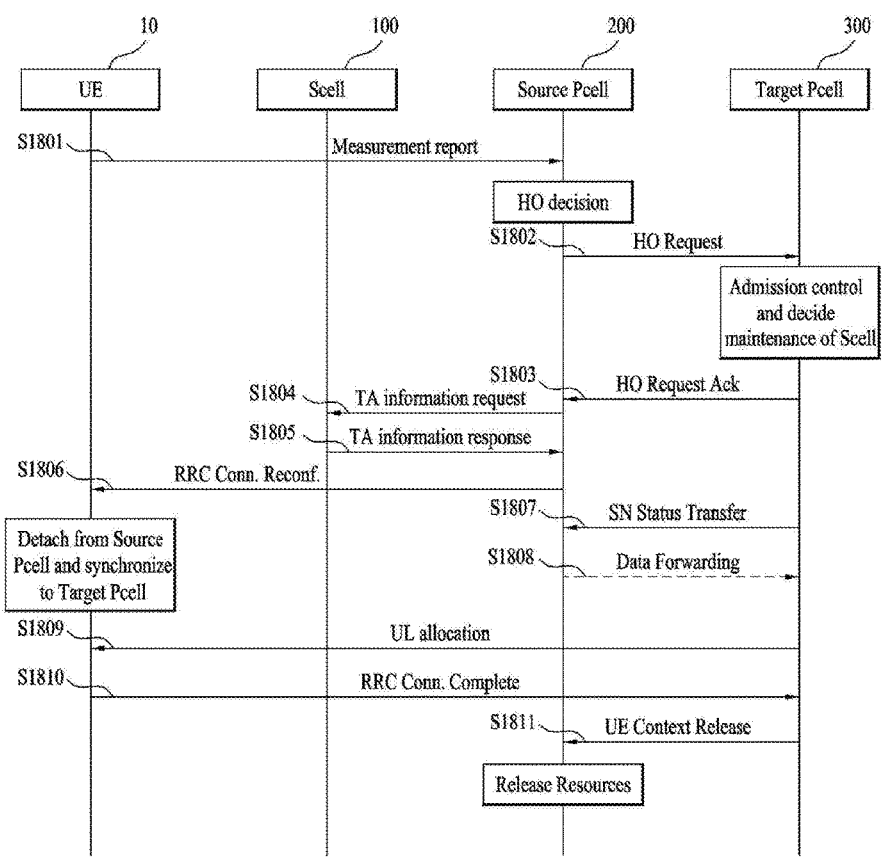
FIG. 18 is a diagram to describe a process for a user equipment to perform a random access procedure according to one embodiment of the present invention.

FIG. 18 is a diagram to describe a process for a user equipment to perform a random access procedure according to one embodiment of the present invention.

Referring to FIG. 18, it shows a process for a user equipment to perform a random access procedure in a situation that the user equipment is dual-connected to source Pcell 200 and Scell 100, according to one embodiment of the present invention.

According to the conventional handover procedure, a target Pcell transmits a target C-RNTI value, which is used by UE in the target Pcell after handover, to a source Pcell through handover request acknowledgement. Having received the above information, the source Pcell transmits the target C-RNTI value to the UE through an RRC (radio resource control) connection configuration message.

As shown in FIG. 18, a user equipment transmits a measurement report containing information on target Pcell 300 into which handover is performed to source Pcell 200 [S1801]. If the source Pcell 200 determines that the handover is performed after receiving the measurement report, the source Pcell 200 transmits a handover request message to the target Pcell 300 [S1802]. If the target Pcell 300 accepts the handover request after receiving the handover request message, the target Pcell 300 transmits a handover request acknowledgement message to the source Pcell 200 [S1803].

Meanwhile, it is assumed in FIG. 18 that Scell 100 manages (is aware of) a timing advance (TA) value between the Scell 100 and target Pcell 300. In this case, the source Pcell 200, which determines whether the handover is performed, is unable to know whether the Scell 100 is aware of the TA (timing advance) value between the Scell 100 and target Pcell 300. Therefore, a process for checking this is required as mentioned in the foregoing description.

Thus, the source Pcell 200 transmits a TA information request message to the Scell 100 [S1804]. Having received the TA information request message, the Scell 100 transmits the TA (timing advance) value between the Scell 100 and target Pcell 300 to the source Pcell 200 through a TA information response message.

A configuration of the TA information response message may be set identical to that of the TA information response message mentioned in the foregoing description with reference to FIG. 13. Through the above processes, the source Pcell 200 may obtain the TA value between the Scell 100 and target Pcell 300.

Subsequently, the source Pcell 200 transmits an RRC connection configuration message to UE 10 and may include PCID (or GCID) of the Scell 100 and the TA (timing advance) value between the Scell 100 and target Pcell 300 in the RRC connection configuration message.

If information related to performance of a random access procedure with respect to the target Pcell 300 is not included in the RRC connection configuration message, the UE 10 may know that a method proposed in the present invention is applied. Subsequently, the UE 10 does not perform the random access procedure with respect to the target Pcell 300 but performs a proposed procedure. Having received the TA value through the RRC connection configuration message, the UE 10 obtains downlink synchronization of the target Pcell 300. Thereafter, the UE 10 obtains uplink synchronization information of the target Pcell 300 using a TA value in the Scell 100, to which the UE 10 is connected, and the TA value between the Scell 100 and target Pcell 300.

The target Pcell 300 transmits an uplink (UL) grant to a search space of UE having the target C-RNTI through the steps S1807 and S1808 for the UE [S1809].

The UE 10, which performs blind decoding using the target C-RNTI, may perform decoding on the UL grant and then transmit an RRC connection complete message to the target Pcell 300 through a resource indicated by the UL grant [S1810].

Through the above processes, an RRC connection is established between the target Pcell 300 and Scell 100 and the UE 10 is able to perform communication with the target Pcell 300. Moreover, the target Pcell 300 transmits a message for requesting connection release (UE context release) to the source Pcell 200 and the source Pcell 200 release the connection with the UE 10 [S1811].

Figure 19:
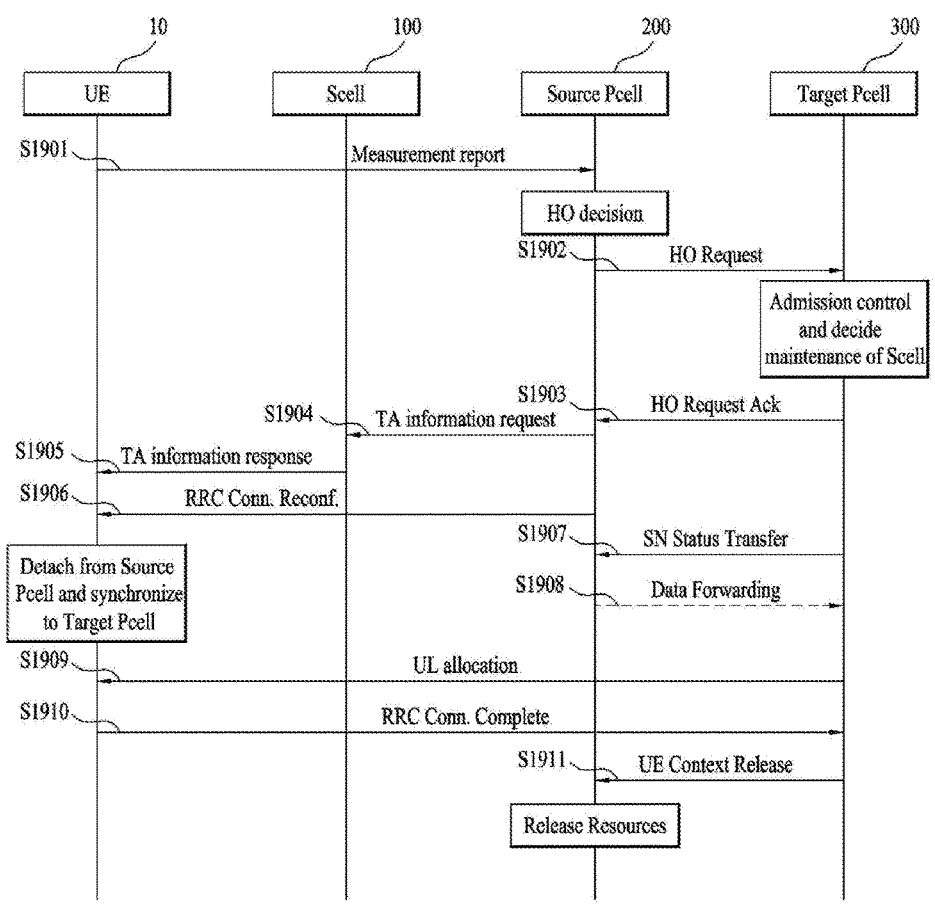
FIG. 19 is a diagram to describe a process for a user equipment to perform a random access procedure according to one embodiment of the present invention.

FIG. 19 is a diagram to describe a process for a user equipment to perform a random access procedure according to one embodiment of the present invention.

Referring to FIG. 19, it shows a process for a user equipment to perform a random access procedure in a situation that the user equipment is dual-connected to source Pcell 200 and Scell 100, according to one embodiment of the present invention.

As shown in FIG. 19, a user equipment transmits a measurement report containing information on target Pcell 300 into which handover is performed to source Pcell 200 [S1901]. If the source Pcell 200 determines that the handover is performed after receiving the measurement report, the source Pcell 200 transmits a handover request message to the target Pcell 300 [S1902]. If the target Pcell 300 accepts the handover request after receiving the handover request message, the target Pcell 300 transmits a handover request acknowledgement message to the source Pcell 200 [S1903].

Meanwhile, it is assumed in FIG. 19 that Scell 100 manages (is aware of) a timing advance (TA) value between the Scell 100 and target Pcell 300. In this case, the source Pcell 200, which determines whether the handover is performed, transmits a TA information request message to the Scell 100 [S1904].

The TA information request message may include a message type (e.g., indicator for indicating whether the corresponding message is the TA information request message), PCID (or GCID) of the Scell 100, PCID (or GCID) of the source Pcell 200, PCID (or GCID) of the target Pcell 300, C-RNTI of UE 10 (it may include C-RNTI in the Scell 100 or C-RNTI in the source Pcell 200) and the like. The TA information request message may be transmitted through backhaul using X2 interface between the Scell 100 and source Pcell 200.

Having received the TA information request message, the Scell 100 transmits a TA information response message to UE 10 of which information is included in the TA information request message [S1905].

The TA information response message may include a message type (e.g., indicator for indicating whether the corresponding message is the TA information response message), PCID (or GCID) of the Scell 100, PCID (or GCID) of the source Pcell 200, PCID (or GCID) of the target Pcell 300, a timing advance (TA) value between the Scell 100 and target Pcell 300 and the like. The TA information response message may be transmitted through a high layer signal in the Scell 100.

Having received the TA information response message, the UE 10 may be aware of the TA value between the Scell 1 and target Pcell 300. In the above-mentioned TA information request message, PCID (or GCID) of the target Pcell 300 may be omitted. Having received the TA information request message in which the PCID (or GCID) of the target Pcell 300 is omitted, the Scell 1 may transmit all TA values of cells, which the Scell 100 knows, to the UE 10 of which information is included in the TA information request message.

The TA information response message may include the message type (e.g., indicator for indicating whether the corresponding message is the TA information response message), PCID (or GCID) of the Scell 100, PCID (or GCID) of the source Pcell 200, {PCID (or GCID) of a random cell of which TA the Scell 100 knows, a TA value between the Scell 100 and random cell} and the like. The TA information response message may be transmitted from the Scell 100 through a high layer signal or the like.

Having received the TA information response message, the UE 10 may know the TA value between the Scell 100 and random cell. Particularly, the UE 10 may know the TA value between the Scell 100 and target Pcell 300 and that the proposed method needs to be applied.

Subsequently, the UE 10 does not perform a general random access procedure but performs the procedure proposed in the present invention. The UE 10 may receive an RRC connection configuration message from the source Pcell 200 [S1906].

A target C-RNTI value may be included in the RRC connection configuration message. Having obtained downlink synchronization of the target Pcell 300 from the source Pcell 200, the UE 10 obtains UL synchronization information of the target Pcell 300 using a TA value in the Scell 100, to which the UE 10 is connected, and the TA value between the Scell 100 and target Pcell 300.

The target Pcell 300 transmits an uplink (UL) grant to a search space of UE having the target C-RNTI through the steps S1907 and S1908 for the UE [S1909].

The UE 10, which performs blind decoding using the target C-RNTI, may perform decoding on the UL grant and then transmit an RRC connection complete message to the target Pcell 300 through a resource indicated by the UL grant [S1910].

Through the above processes, an RRC connection is established between the target Pcell 300 and Scell 100 and the UE 10 is able to perform communication with the target Pcell 300. Moreover, the target Pcell 300 transmits a message for requesting connection release (UE context release) to the source Pcell 200 and the source Pcell 200 release the connection with the UE 10 [S1911].

Figure 20:
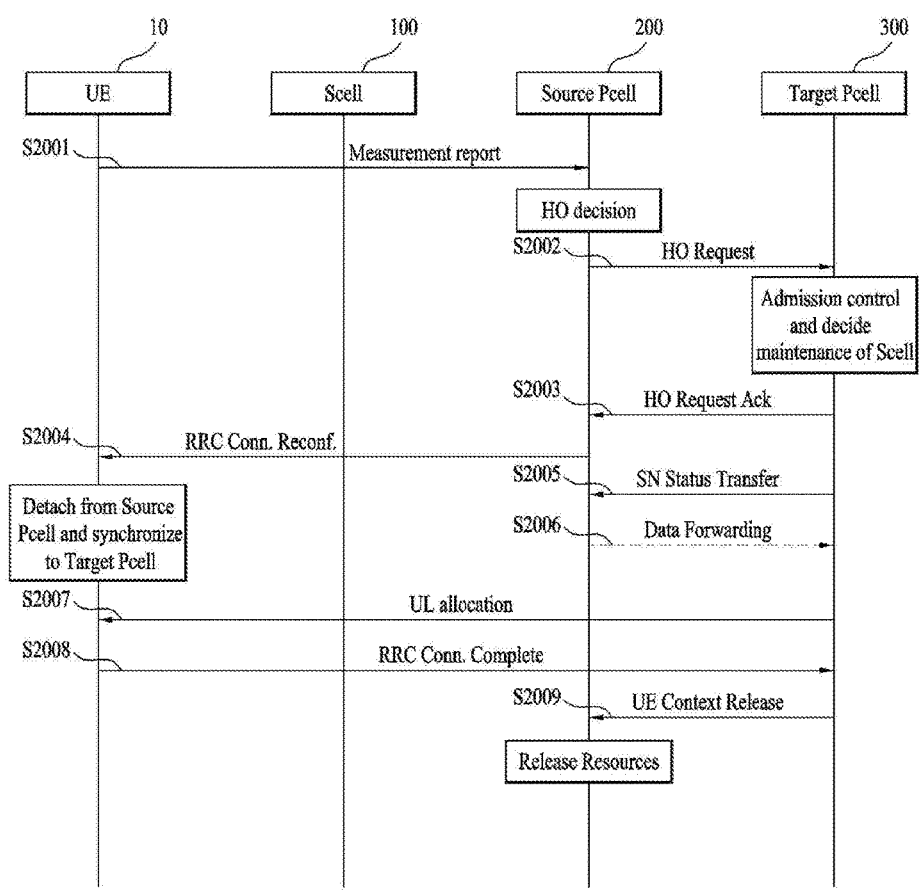
FIG. 20 is a diagram to describe a process for a user equipment to perform a random access procedure according to one embodiment of the present invention.

FIG. 20 is a diagram to describe a process for a user equipment to perform a random access procedure according to one embodiment of the present invention.

Referring to FIG. 20, it shows a process for a user equipment to perform a random access procedure in a situation that the user equipment is dual-connected to source Pcell 200 and Scell 100, according to one embodiment of the present invention.

As shown in FIG. 20, a user equipment transmits a measurement report containing information on target Pcell 300 into which handover is performed to source Pcell 200 [S2001]. If the source Pcell 200 determines that the handover is performed after receiving the measurement report, the source Pcell 200 transmits a handover request message to the target Pcell 300 [S2002]. If the target Pcell 300 accepts the handover request after receiving the handover request message, the target Pcell 300 transmits a handover request acknowledgement message to the source Pcell 200 [S2003].

Meanwhile, it is assumed in FIG. 20 that the source Pcell 200 manages (is aware of) a timing advance (TA) value between the Scell 100 and target Pcell 300. In particular, the source Pcell 200 is aware of the TA value between the Scell 100 and target Pcell 300 and is able to manage the TA value.

In this case, if the source Pcell 200 determines handover of dual connectivity UE 10 simultaneously connected to the source Pcell 200 and Scell 100 into the target Pcell 300, the source Pcell 200 may transmit an RRC connection reconfiguration message to the UE 10 during a handover procedure [S2004].

Through the RRC connection reconfiguration message, PCID (or GCID) of the target Pcell 300, PCID (or GCID) of the Scell 100, the TA value between the Scell 100 and target Pcell 300 and the like may be additionally transmitted.

Having received the RRC connection reconfiguration message, the UE 10 may obtain the TA value between the Scell 100 and target Pcell 300 as well as an existing target C-RNTI value.

If information related to performance of a random access procedure with respect to the target Pcell 300 is not included in the RRC connection reconfiguration message, the UE 10 may know that a method proposed in the present invention is applied. Subsequently, the UE 10 does not perform the random access procedure with respect to the target Pcell 300 but performs a procedure proposed in the present invention.

Having obtained downlink synchronization of the target Pcell 300 from the source Pcell 200, the UE 10 obtains uplink synchronization information of the target Pcell 300 using a TA value in the Scell 100, to which the UE 10 is connected, and the TA value between the Scell 100 and target Pcell 300.

The target Pcell 300 transmits an uplink (UL) grant to a search space of UE having the target C-RNTI through the steps S2005 and S2006 for the UE [S2007].

The UE 10, which performs blind decoding using the target C-RNTI, may perform decoding on the UL grant and then transmit an RRC connection complete message to the target Pcell 300 through a resource indicated by the UL grant [S2008].

Through the above processes, an RRC connection is established between the target Pcell 300 and Scell 100 and the UE 10 is able to perform communication with the target Pcell 300. Moreover, the target Pcell 300 transmits a message for requesting connection release (UE context release) to the source Pcell 200 and the source Pcell 200 release the connection with the UE 10 [S2009].

Figure 21:
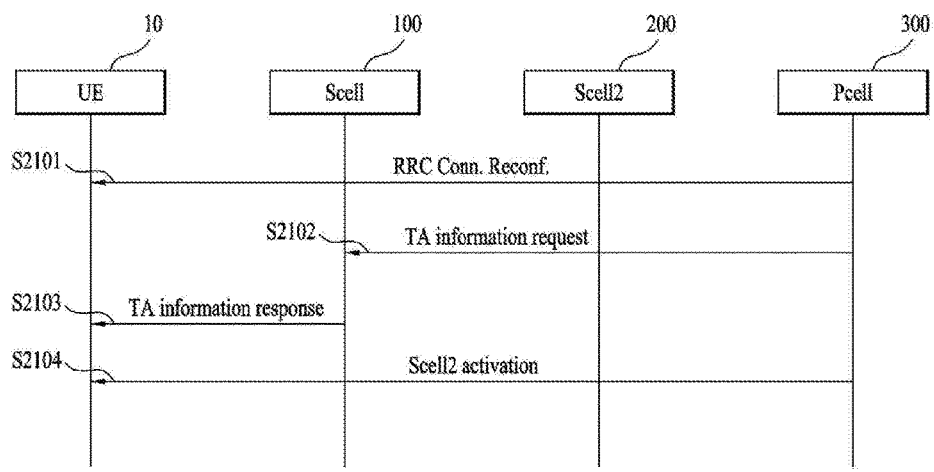
FIG. 21 is a diagram to describe a process for a dual connectivity user equipment to add a small cell according to one embodiment of the present invention.

FIG. 21 is a diagram to describe a process for a dual connectivity user equipment to add a small cell according to one embodiment of the present invention.

Referring to FIG. 21, it shows a case that dual connectivity UE simultaneously connected to Pcell 300 and Scell 1 100 adds Scell 2 200. In particular, if the Scell 2 200 and Scell 1 100 belong to sTAG in the scenario shown in FIG. 11, UE 10 may perform a random access procedure with respect to the Scell 2 200.

In this case, according to one embodiment of the present invention, in case of Scell addition, uplink synchronization of the newly added Scell 2 200 may be performed more rapidly.

The Scell 1 100 or Scell 2 200 may obtain a TA value between the newly added Scell 200 and the Scell 100 having the existing dual connectivity UE connected thereto through the above-mentioned process for the Scell 1 100 to transmit PRACH to the Scell 2 200 or the above-mentioned process for the Scell 2 200 to transmit PRACH to the Scell 1 100. If the TA value between the Scell 1 100 and Scell 2 200 is transmitted to the UE connected to the Scell 1 100, the corresponding UE may perform uplink synchronization of the Scell 200 more rapidly.

When the Scell is added, several methods may be applied depending on subjects that manage the TA value between the Scell 1 100 and Scell 2 200. FIG. 21 shows a case that the Scell 1 100 manages the TA value.

The Scell 1 100 having the dual connectivity UE connected thereto may manage the TA value between the Scell 1 100 and the newly added Scell 2 200.

For instance, in FIG. 21, the Pcell 300 transmits a message for adding the Scell 2 200 to the UE 10 using an RRC connection reconfiguration message [S2101].

In this case, if information related to performance of the random access procedure with respect to the Scell 2 200 is not included in the RRC connection reconfiguration message or if an indicator for indicating that a method proposed in the present invention is applied is transmitted, the UE 10 may know that the method proposed in the present invention needs to be applied. Subsequently, the UE 10 does not perform the random access procedure with respect to the Scell 2 200 but performs a procedure proposed in the present invention.

Thereafter, the Pcell 300 transmits a TA information request message to the Scell 1 100 [S2102].

The TA information request message may include a message type (e.g., indicator for indicating whether the corresponding message is the TA information request message), PCID (or GCID) of the Scell 1 100, PCID (or GCID) of the Pcell 300, PCID (or GCID) of the Scell 2 200, C-RNTI of the UE 10 (it may include C-RNTI in the Scell 1 100 or C-RNTI in the Pcell 300) and the like. The TA information request message may be transmitted through backhaul (including air-backhaul) using X2 interface between the Scell 1 100 and Pcell 300.

Having received the TA information request message, the Scell 1 100 transmits a TA information response message to the UE 10 of which information is included in the TA information request message [S2103].

The TA information response message may include a message type (e.g., indicator for indicating whether the corresponding message is the TA information response message), PCID (or GCID) of the Scell 1 100, PCID (or GCID) of the Pcell 300, PCID (or GCID) of the Scell 2 200, the TA value between the Scell 1 100 and Scell 2 200 and the like. The TA information response message may be transmitted through a high layer signal of the Scell 1 100 or the like.

Having received the TA information response message, the UE 10 may know the TA value between the Scell 1 100 and Scell 2 200. In the above-mentioned TA information request message, PCID (or GCID) of the Scell 2 200 may be omitted. Having received the TA information request message in which the PCID (or GCID) of the Scell 2 200 is omitted, the Scell 1 100 may transmit all TA values of cells, which the Scell 1 100 knows, to the UE 10 of which information is included in the TA information request message.

The TA information response message may include the message type (e.g., indicator for indicating whether the corresponding message is the TA information response message), PCID (or GCID) of the Scell 1 100, PCID (or GCID) of the Pcell 300, {PCID (or GCID) of a random cell of which TA the Scell 1 100 knows, a TA value between the Scell 1 100 and random cell} and the like. The TA information response message may be transmitted from the Scell 100 through a high layer signal or the like.

Having received the TA information response message, the UE 10 may know the TA value between the Scell 1 100 and random cell. Particularly, the UE 10 may know the TA value between the Scell 1 100 and Scell 2 200.

Thereafter, the UE 10 may receive a Scell activation message (particularly, a Scell2 activation message) from the Pcell 300 [S2104].

Having obtained downlink synchronization of the Scell 2 200, the UE 10 obtains uplink synchronization information of the Scell 2 200 using a TA value in the Scell 1 100, to which the UE 10 is connected, and the TA value between the Scell 1 100 and Scell 2 200. Through the above processes, the UE 10 is able to communicate with the Scell 2 200.

Figure 22:
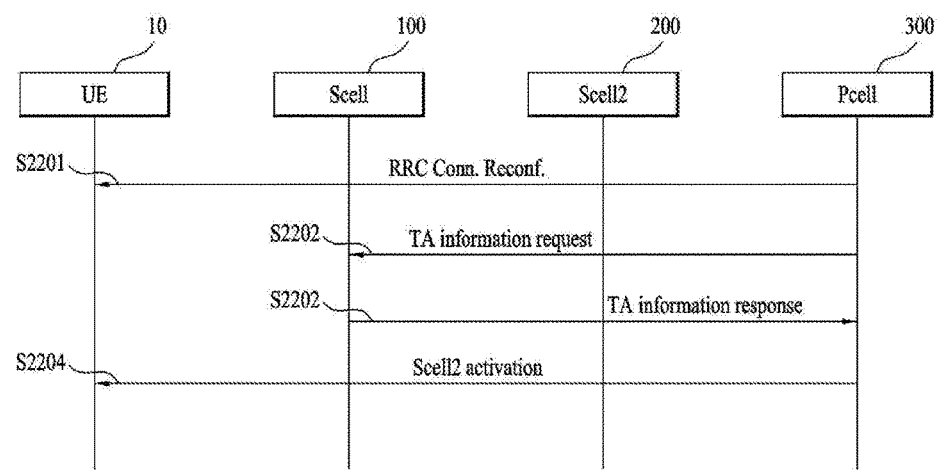
FIG. 22 is a diagram to describe a process for a dual connectivity user equipment to add a small cell according to one embodiment of the present invention.

FIG. 22 is a diagram to describe a process for a dual connectivity user equipment to add a small cell according to one embodiment of the present invention.

Referring to FIG. 22, it shows a case that dual connectivity UE simultaneously connected to Pcell 300 and Scell 1 100 adds Scell 2 200. In particular, if the Scell 2 200 and Scell 1 100 belong to sTAG in the scenario shown in FIG. 11, UE 10 may perform a random access procedure with respect to the Scell 2 200.

In this case, according to one embodiment of the present invention, in case of Scell addition, uplink synchronization of the newly added Scell 2 200 may be performed more rapidly.

When the Scell is added, several methods may be applied depending on subjects that manage a TA value between the Scell 1 100 and Scell 2 200. FIG. 22 shows a case that the Pcell 300 manages the TA value.

The Pcell 300 having the dual connectivity UE connected thereto may manage the TA value between the Scell 1 100 and the newly added Scell 2 200.

For instance, in FIG. 22, the Pcell 300 transmits a message for adding the Scell 2 200 to the UE 10 using an RRC connection reconfiguration message [S2201].

In this case, if information related to performance of the random access procedure with respect to the Scell 2 200 is not included in the RRC connection reconfiguration message or if an indicator for indicating that a method proposed in the present invention is applied is transmitted, the UE 10 may know that the method proposed in the present invention needs to be applied. Subsequently, the UE 10 does not perform the random access procedure with respect to the Scell 2 200 but performs a procedure proposed in the present invention.

Thereafter, the Pcell 300 transmits a TA information request message to the Scell 1 100 [S2202].

The TA information request message may include a message type (e.g., indicator for indicating whether the corresponding message is the TA information request message), PCID (or GCID) of the Scell 1 100, PCID (or GCID) of the Pcell 300, PCID (or GCID) of the Scell 2 200, C-RNTI of the UE 10 (it may include C-RNTI in the Scell 1 100 or C-RNTI in the Pcell 300) and the like. The TA information request message may be transmitted through backhaul (including air-backhaul) using X2 interface between the Scell 1 100 and Pcell 300.

Having received the TA information request message, the Scell 1 100 transmits a TA information response message to the Pcell 300 [S2203].

The TA information response message may include a message type (e.g., indicator for indicating whether the corresponding message is the TA information response message), PCID (or GCID) of the Scell 1 100, PCID (or GCID) of the Pcell 300, PCID (or GCID) of the Scell 2 200, the TA value between the Scell 1 100 and Scell 2 200 and the like. The TA information response message may be transmitted through backhaul (including air-backhaul) using the X2 interface between the Scell 1 100 and Pcell 300.

Having received the TA information response message, the Pcell 300 may know the TA value between the Scell 1 100 and Scell 2 200. In the above-mentioned TA information request message, PCID (or GCID) of the Scell 2 200 may be omitted. Having received the TA information request message in which the PCID (or GCID) of the Scell 2 200 is omitted, the Scell 1 100 may transmit all TA values of cells, which the Scell 1 100 knows, to the UE 10 of which information is included in the TA information request message.

The TA information response message may include the message type (e.g., indicator for indicating whether the corresponding message is the TA information response message), PCID (or GCID) of the Scell 1 100, PCID (or GCID) of the Pcell 300, {PCID (or GCID) of a random cell of which TA the Scell 1 100 knows, a TA value between the Scell 1 100 and random cell} and the like. The TA information response message may be transmitted through backhaul (including air-backhaul) using the X2 interface between the Scell 1 100 and Pcell 300.

Having received the TA information response message, the Pcell 300 may know the TA value between the Scell 1 100 and random cell. Particularly, the Pcell 300 may know the TA value between the Scell 1 100 and Scell 2 200.

Thereafter, the Pcell 300 may transmit a Scell activation message (particularly, a Scell2 activation message) to the UE 10 [S2204].

Having received the Scell2 activation message from the Pcell 300, the UE 10 obtains downlink synchronization of the Scell 2 200. Subsequently, the UE 10 obtains uplink synchronization information of the Scell 2 200 using a TA value in the Scell 1 100, to which the UE 10 is connected, and the TA value between the Scell 1 100 and Scell 2 200. Through the above processes, the UE 10 is able to communicate with the Scell 2 200.

Figure 23:
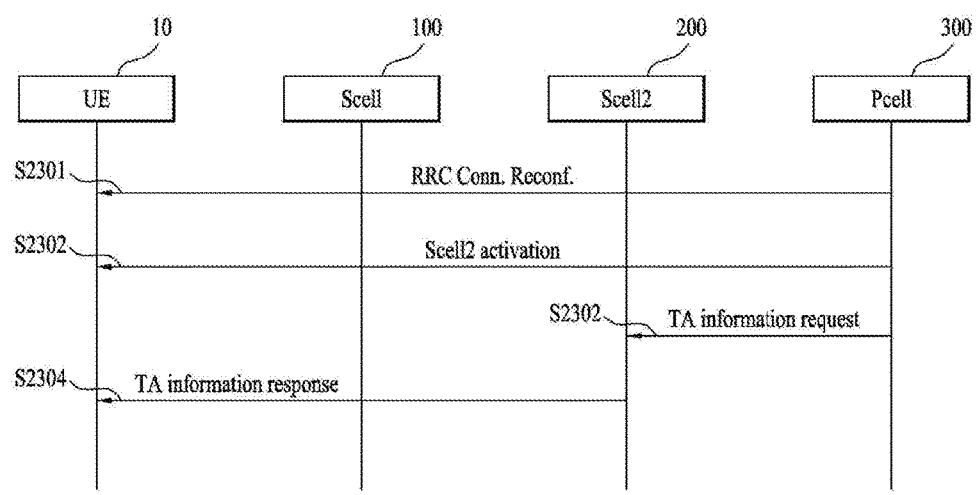
FIG. 23 is a diagram to describe a process for a dual connectivity user equipment to add a small cell according to one embodiment of the present invention.

FIG. 23 is a diagram to describe a process for a dual connectivity user equipment to add a small cell according to one embodiment of the present invention.

Referring to FIG. 23, it shows a case that dual connectivity UE simultaneously connected to Pcell 300 and Scell 1 100 adds Scell 2 200. In particular, if the Scell 2 200 and Scell 1 100 belong to sTAG in the scenario shown in FIG. 11, UE 10 may perform a random access procedure with respect to the Scell2 200.

In this case, according to one embodiment of the present invention, in case of Scell addition, uplink synchronization of the newly added Scell2 200 may be performed more rapidly.

When the Scell is added, several methods may be applied depending on subjects that manage a TA value between the Scell 1 100 and Scell2 200. FIG. 23 shows a case that the Scell2 200 manages the TA value.

For instance, in FIG. 23, the Pcell 300 transmits a message for adding the Scell2 200 to the UE 10 using an RRC connection reconfiguration message [S2301].

In this case, if information related to performance of the random access procedure with respect to the Scell 2 200 is not included in the RRC connection reconfiguration message or if an indicator for indicating that a method proposed in the present invention is applied is transmitted, the UE 10 may know that the method proposed in the present invention needs to be applied. Subsequently, the UE 10 does not perform the random access procedure with respect to the Scell2 200 but performs a procedure proposed in the present invention.

Thereafter, the Pcell 300 transmits a Scell activation message (particularly, a Scell2 activation message) to the UE 10 [S2302].

Having received the Scell2 activation message from the Pcell 300, the UE 10 may obtain downlink synchronization of the Scell2 200.

Meanwhile, the Pcell 300 transmits a TA information request message to the Scell2 200 [S2303].

The TA information request message may include a message type (e.g., indicator for indicating whether the corresponding message is the TA information request message), PCID (or GCID) of the Scell 1 100, PCID (or GCID) of the Pcell 300, PCID (or GCID) of the Scell2 200, C-RNTI of the UE 10 (it may include C-RNTI in the Scell 1 100 or C-RNTI in the Pcell 300) and the like. The TA information request message may be transmitted through backhaul (including air-backhaul) using X2 interface between the Scell 2 200 and Pcell 300.

Having received the TA information request message, the Scell 2 200 transmits a TA information response message to the UE 10 of which information is included in the TA information request message [S2304].

The TA information response message may include a message type (e.g., indicator for indicating whether the corresponding message is the TA information response message), PCID (or GCID) of the Scell 1 100, PCID (or GCID) of the Pcell 300, PCID (or GCID) of the Scell 2 200, the TA value between the Scell 1 100 and Scell 2 200 and the like. The TA information response message may be transmitted through a high layer signal or the like.

Having received the TA information response message, the UE 10 may know the TA value between the Scell 1 100 and Scell 2 200. In the above-mentioned TA information request message, PCID (or GCID) of the Scell 1 100 may be omitted. Having received the TA information request message in which the PCID (or GCID) of the Scell 1 100 is omitted, the Scell 2 200 may transmit all TA values of cells, which the Scell 2 200 knows, to the UE 10.

The TA information response message may include the message type (e.g., indicator for indicating whether the corresponding message is the TA information response message), PCID (or GCID) of the Scell 2 200, {PCID (or GCID) of a random cell of which TA the Scell 2 200 knows, a TA value between the Scell 2 200 and random cell} and the like. The TA information response message may be transmitted through a high layer signal or the like.

Having received the TA information response message, the UE 10 may know the TA value between the Scell 2 200 and random cell. Particularly, the UE 10 may know the TA value between the Scell 1 100 and Scell 2 200. The UE 10 obtains uplink synchronization information of the Scell 2 200 using a TA value in the Scell 1 100, to which the UE 10 is connected, and the TA value between the Scell 1 100 and Scell 2 200. Through the above processes, the UE 10 is able to communicate with the Scell 2 200.

Figure 24:
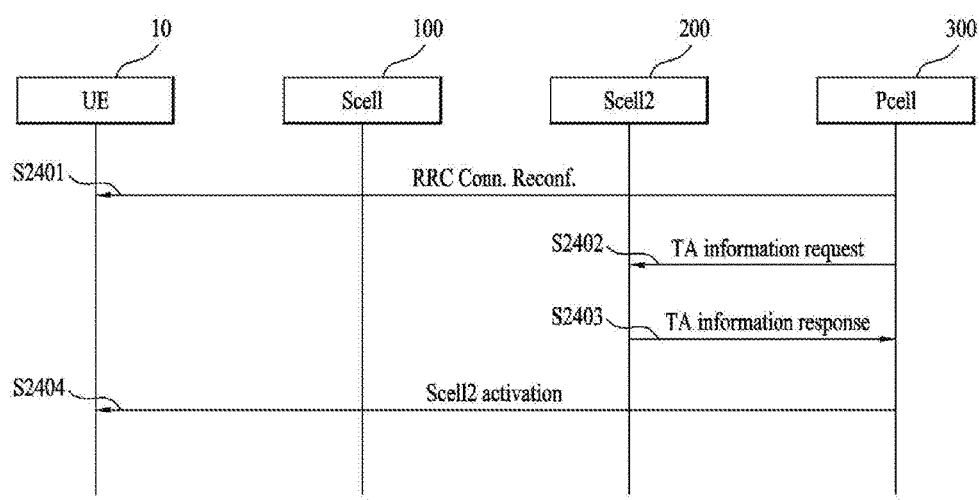
FIG. 24 is a diagram to describe a process for a dual connectivity user equipment to add a small cell according to one embodiment of the present invention.

FIG. 24 is a diagram to describe a process for a dual connectivity user equipment to add a small cell according to one embodiment of the present invention.

Referring to FIG. 24, it shows a case that dual connectivity UE simultaneously connected to Pcell 300 and Scell 1 100 adds Scell 2 200. In particular, if the Scell 2 200 and Scell 1 100 belong to sTAG in the scenario shown in FIG. 11, UE 10 may perform a random access procedure with respect to the Scell 2 200.

In this case, according to one embodiment of the present invention, in case of Scell addition, uplink synchronization of the newly added Scell 2 200 may be performed more rapidly.

When the Scell is added, several methods may be applied depending on subjects that manage a TA value between the Scell 1 100 and Scell 2 200. FIG. 24 shows a case that the Scell 2 200 manages the TA value.

For instance, in FIG. 24, the Pcell 300 transmits a message for adding the Scell 2 200 to the UE 10 using an RRC connection reconfiguration message [S2401].

In this case, if information related to performance of the random access procedure with respect to the Scell 2 200 is not included in the RRC connection reconfiguration message or if an indicator for indicating that a method proposed in the present invention is applied is transmitted, the UE 10 may know that the method proposed in the present invention needs to be applied. Subsequently, the UE 10 does not perform the random access procedure with respect to the Scell 2 200 but performs a procedure proposed in the present invention.

Thereafter, the Pcell 300 transmits a TA information request message to the Scell 2 200 [S2402].

The TA information request message may include a message type (e.g., indicator for indicating whether the corresponding message is the TA information request message), PCID (or GCID) of the Scell 1 100, PCID (or GCID) of the Pcell 300, PCID (or GCID) of the Scell 2 200, C-RNTI of the UE 10 (it may include C-RNTI in the Scell 1 100 or C-RNTI in the Pcell 300) and the like. The TA information request message may be transmitted through backhaul (including air-backhaul) using X2 interface between the Scell 2 200 and Pcell 300.

Having received the TA information request message, the Scell 2 200 transmits a TA information response message to the Pcell 300 [S2304].

The TA information response message may include a message type (e.g., indicator for indicating whether the corresponding message is the TA information response message), PCID (or GCID) of the Scell 1 100, PCID (or GCID) of the Pcell 300, PCID (or GCID) of the Scell 2 200, the TA value between the Scell 1 100 and Scell 2 200 and the like. The TA information response message may be transmitted through backhaul (including air-backhaul) using the X2 interface between the Scell 2 200 and Pcell 300.

Having received the TA information response message, the Pcell 300 may know the TA value between the Scell 1 100 and Scell 2 200. In the above-mentioned TA information request message, PCID (or GCID) of the Scell 1 100 may be omitted. Having received the TA information request message in which the PCID (or GCID) of the Scell 1 100 is omitted, the Scell 2 200 may transmit all TA values of cells, which the Scell 2 200 knows, to the Pcell 300.

The TA information response message may include the message type (e.g., indicator for indicating whether the corresponding message is the TA information response message), PCID (or GCID) of the Scell 2 200, {PCID (or GCID) of a random cell of which TA the Scell 2 200 knows, a TA value between the Scell 2 200 and random cell} and the like. The TA information response message may be transmitted through backhaul (including air-backhaul) using X2 interface between the Scell 2 200 and Pcell 300.

Having received the TA information response message, the Pcell 300 may know the TA value between the Scell 2 200 and random cell. Particularly, the Pcell 300 may know the TA value between the Scell 1 100 and Scell 2 200. The Pcell 300 may transmit a Scell activation message (particularly, a Scell2 activation message) to the UE 10 [S2404].

Having received the Scell 2 activation message from the Pcell 300, the UE 10 may obtain downlink synchronization of the Scell 2 200. Subsequently, the UE 10 obtains uplink synchronization information of the Scell 2 200 using a TA value in the Scell 1 100, to which the UE 10 is connected, and the TA value between the Scell 1 100 and Scell 2 200. Through the above processes, the UE 10 is able to communicate with the Scell 2 200.

Figure 25:
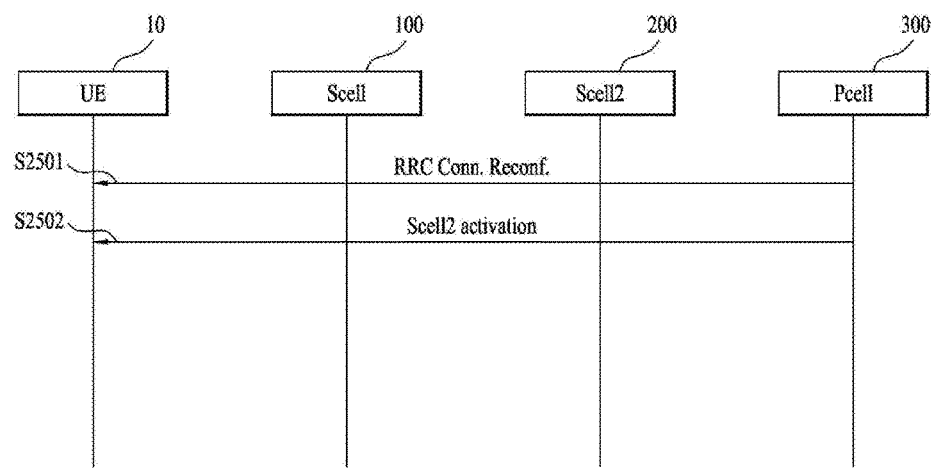
FIG. 25 is a diagram to describe a process for a dual connectivity user equipment to add a small cell according to one embodiment of the present invention.

FIG. 25 is a diagram to describe a process for a dual connectivity user equipment to add a small cell according to one embodiment of the present invention.

Referring to FIG. 25, it shows a case that dual connectivity UE simultaneously connected to Pcell 300 and Scell 1 100 adds Scell 2 200. In particular, if the Scell 2 200 and Scell 1 100 belong to sTAG in the scenario shown in FIG. 11, UE 10 may perform a random access procedure with respect to the Scell 2 200.

In this case, according to one embodiment of the present invention, in case of Scell addition, uplink synchronization of the newly added Scell 2 200 may be performed more rapidly.

When the Scell is added, several methods may be applied depending on subjects that manage a TA value between the Scell 1 100 and Scell 2 200. FIG. 25 shows a case that the Pcell 300 manages the TA value.

Meanwhile, the Pcell 300 may be aware of the TA value between the Scell 1 100 and Scell 2 200. In this case, when transmitting an RRC connection reconfiguration message for adding the Scell 2 200 to the dual connectivity UE 10 simultaneously connected to the Pcell 300 and Scell 100 [S2501], the Pcell 300 may additionally transmit PCID (or GCID) the Scell 1 100, PCID (or GCID) of the Scell 2 200, the TA value between the Scell 1 100 and Scell 2 200 and the like. Otherwise, when transmitting a Scell2 activation message for activating the Scell 2 200 [S2502], the Pcell 300 may additionally transmit PCID (or GCID) the Scell 1 100, PCID (or GCID) of the Scell 2 200, the TA value between the Scell 1 100 and Scell 2 200 and the like.

Having received the above information, the UE 10 may obtain uplink synchronization information of the Scell 2 200 more rapidly using the TA value between the Scell 1 100 and Scell 2 200 and a TA value between the Scell 1 100 and UE 10 after the activation of the Scell 2 200.

In particular, the UE 10 may obtain the uplink synchronization information without performing the random access procedure with respect to the Scell 2 200.

Figure 26:
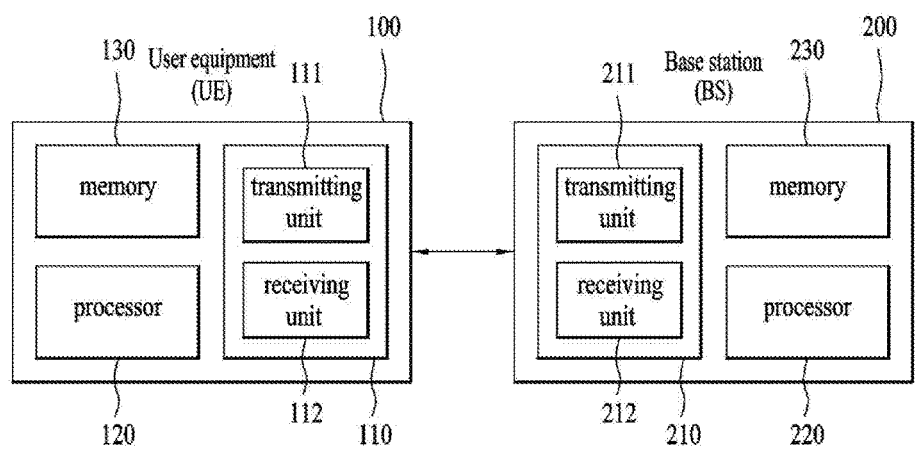
FIG. 26 is a block diagram for an example of a user equipment receiving information for synchronization from a base station in a wireless communication system according to one embodiment of the present invention.

FIG. 26 is a block diagram for an example of a user equipment receiving information for synchronization from a base station in a wireless communication system according to one embodiment of the present invention.

Although FIG. 26 shows one to one communication environment between a user equipment 100 and a base station 200, communication environment can be established between a plurality of user equipments and a base station.

Referring to FIG. 26, a user equipment 100 may include a radio frequency (RF) unit 110 including a transmitting unit 111 and a receiving unit 112, a processor 120 and a memory 130.

Overall communication processes of the user equipment 100 including signal processing, layer processing and the like are controlled by the processor 120 and the memory 130. Moreover, connection relations may be formed between the RF unit 110, the processor 120 and the memory 130.

The RF unit 110 included in the user equipment 100 may include the transmitting unit 111 and the receiving unit 112. The transmitting unit 111 and the receiving unit 112 may be configured to transceive signals with the base station 200 or other devices.

The processor 120 is functionally connected to the transmitting unit 111 and the receiving unit 112 in the RF unit 110 and may be configured to control processes for the transmitting unit 111 and the receiving unit 112 to transceive the signals with the base station 200 and other devices. And, the processor 120 performs various processing on a signal to be transmitted and then transmits the signal to the transmitting unit 111. The receiving unit 112 may perform processing on the received signal.

If necessary, the processor 120 can save information included in an exchanged message in the memory 130. The user equipment 100 may perform the above-mentioned various embodiments of the present invention based on the aforementioned structure.

An RF unit 210, which includes a transmitting unit 211 and a receiving unit 212, of the base station 200 may be configured to transceive signals with the user equipment 100. A processor 220 of the base station 200 is functionally connected to the transmitting unit 211 and the receiving unit 212 and may be configured to control processes for the transmitting unit 211 and the receiving unit 212 to transceive signals with other devices including the user equipment 100.

The processor 220 performs various processing on a signal to be transmitted and then transmits the signal to the transmitting unit 211. The receiving unit 212 may perform processing on the received signal.

If necessary, the processor 220 can save information included in an exchanged message in a memory 230. The base station 200 may perform the above-mentioned various embodiments of the present invention based on the aforementioned structure.

The processor 120 of the user equipment 100 instructs (e.g., controls, adjusts, manages, etc.) operations of the user equipment 100. And, the processor 220 of the base station 200 instructs (e.g., controls, adjusts, manages, etc.) operations of the base station 200. The processor 120/220 may be connected to the memory 130/230 capable of storing program codes and data. The memory 130/230 may store an operating system, an application and general files in a manner of being connected to the processor 120/220.

The processor 120/220 of the present invention may be referred to as a controller, a microcontroller, a microprocessor, a microcomputer or the like. Meanwhile, the processor 120/220 may be implemented using hardware, firmware, software and/or any combinations thereof.

In case of the implementation by firmware or software, one embodiment of the present invention may be implemented by modules, procedures, and/or functions for performing the above-explained functions or operations. Software code may be stored in the memory 130/230 and may be then drivable by the processor 120/220. The memory 130/230 may be provided within or outside the user equipment 100/the base station 200 to exchange data with the processor 120/220 through the various means known to the public.

In case of the implementation using hardware, one embodiment of the present invention may be implemented by one of ASICs (application specific integrated circuits), DSPs (digital signal processors), DSPDs (digital signal processing devices), PLDs (programmable logic devices), FPGAs (field programmable gate arrays) and the like installed in the processor 120/220.

Meanwhile, the aforementioned method can be written as computer programs and can be implemented in general-use digital computers that execute the programs using a computer readable recording medium. And, a data structure used for the aforementioned method can be recorded by various means in a computer-readable media. Program storing devices usable for explaining a storing device, which includes an executable computer code configured to perform various methods of the present invention, should not be understood as a device including such temporary objects as carrier waves and signals. The computer-readable media includes such a storing media as a magnetic storing media (e.g., a ROM, a floppy disk, a hard disk and the like) and an optical reading media (e.g., a CD-ROM, a DVD and the like).

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

A method for a base station to transmit information for synchronization of a user equipment can be applied to various kinds of wireless communication systems.

What is claimed is:

1. A method of transmitting information for uplink synchronization of a user equipment transmitted by a base station in a wireless communication system, the method comprising:
   transmitting, by a source base station, a request message related to synchronization information to a target base station according to a predetermined standard;
   receiving, by a source base station, a response message including the synchronization information from the target base station in response to the request message, wherein the synchronization information is obtained based on the request message by the target base station; and
   transmitting, by a source base station, the received synchronization information to one or more user equipments,
   wherein the synchronization information is used by the user equipments for handover to the target base station, and
   wherein the user equipments perform the handover to the target base station without additional procedure for obtaining the synchronization information from the target base station.

2. The method of claim 1, wherein the source base station comprises a small fixed base station with a constant distance from the target base station and small coverage compared to a macro base station.

3. The method of claim 1, wherein the synchronization information comprises a TA (timing advance) value between the source base station and the target base station.

4. The method of claim 1, wherein the predetermined standard comprises a case that even if the source base station receives measurement information on the target base station from the user equipment, the source base station is unable to know a TA (timing advance) value between the source base station and the target base station.

5. The method of claim 1, wherein the predetermined standard comprises a case that the number of user equipments to perform handover to the target base station is equal to or larger than a prescribed number.

6. The method of claim 1, wherein the predetermined standard comprises a case that even if the source base station receives a TA (timing advance) information request message from an additional base station in a situation that the user equipment is simultaneously connected to the additional base station besides the source base station, the source base station is unable to know a TA (timing advance) value between the source base station and the target base station.

7. The method of claim 1, wherein the predetermined standard comprises a case that a set time of a timer possibly included in the source base station elapses.

8. The method of claim 1, wherein the response message is received through a backhaul network between the source base station and the target base station.

9. The method of claim 6, wherein the received synchronization information is transmitted to the additional base station.

10. The method of claim 1, wherein the source base station comprises a base station providing service to a $1^{st}$ Pcell (primary cell), and
wherein the user equipments comprise user equipments moving from the $1^{st}$ Pcell to a $2^{nd}$ Pcell served by the target base station.

11. The method of claim 1, wherein the source base station comprises a base station providing service to a $1^{st}$ Scell (secondary cell), and
wherein the user equipments comprise user equipments moving from a $1^{st}$ Pcell (primary cell) to a $2^{nd}$ Pcell served by the target base station.

12. The method of claim 1, wherein the source base station comprises a base station providing service to a $1^{st}$ Scell (secondary cell), and
wherein the user equipments comprise user equipments further adding a $2^{nd}$ Scell served by the target base station besides the $1^{st}$ Scell.

13. A method of performing communication performed by a user equipment in a wireless access network environment, the method comprising:
transmitting a request message for handover to a target base station to a source base station;
receiving information for uplink synchronization with the target base station from the source base station; and
performing a procedure for the handover to the target cell,
wherein the user equipment performs the procedure for handover to the target base station without additional procedure for obtaining the synchronization information from the target base station.

14. In performing communication in a wireless communication system, a user equipment comprising:
a transmitting unit;
a receiving unit; and
a processor that controls the transmitting unit and the receiving unit,
wherein the processor is further:
control the transmitting unit to transmit a request message for handover to a target base station to a source base station,
controls the receiving unit to receive information for uplink synchronization with the target base station from the source base station, and
performs a procedure for the handover to the target base station,
wherein the user equipment performs the procedure for handover to the target base station without additional procedure for obtaining the synchronization information from the target base station.

15. In transmitting information for uplink synchronization of a user equipment in a wireless communication system, an apparatus comprising:
a transmitting unit;
a receiving unit; and
a processor that controls the transmitting unit and the receiving unit,
wherein the processor is further configured to:
transmit a request message related to synchronization information to a target base station to which the user equipment performs handover according to a predetermined standard,
receive a response message including the synchronization information from the target base station in response to the request message,
wherein the synchronization information is obtained based on the request message by the target base station, and
transmit the received synchronization information to one or more user equipments, intending to move into a cell served by the target base station,
wherein the user equipments perform the handover to the target base station without additional procedure for obtaining the synchronization information from the target base station.

* * * * *